United States Patent
Radcliffe et al.

(10) Patent No.: US 11,822,937 B1
(45) Date of Patent: Nov. 21, 2023

(54) SYSTEMS AND METHODS FOR EXECUTION IN DYNAMIC APPLICATION RUNTIME ENVIRONMENTS

(71) Applicant: Appian Corporation, McLean, VA (US)

(72) Inventors: Andrew Radcliffe, McLean, VA (US); Antonio Andrade Garcia, McLean, VA (US); Marco Pescosolido, McLean, VA (US); Matt Hilliard, McLean, VA (US)

(73) Assignee: Appian Corporation, McLean, VA (US)

( * ) Notice: Subject to any disclaimer, the term of this patent is extended or adjusted under 35 U.S.C. 154(b) by 0 days.

(21) Appl. No.: 18/179,597

(22) Filed: Mar. 21, 2023

(51) Int. Cl.
  *G06F 9/44* (2018.01)
  *G06F 9/445* (2018.01)
  *G06F 21/12* (2013.01)

(52) U.S. Cl.
  CPC ........ *G06F 9/44505* (2013.01); *G06F 21/121* (2013.01)

(58) Field of Classification Search
  CPC ................ G06F 9/44; G06F 1/12; G06F 1/32
  See application file for complete search history.

(56) References Cited

U.S. PATENT DOCUMENTS

| | | | | |
|---|---|---|---|---|
| 2006/0184613 A1* | 8/2006 | Stienessen | .......... | G06F 16/9574 707/E17.12 |
| 2011/0087672 A1* | 4/2011 | Hui | ....................... | G06F 16/951 707/E17.069 |
| 2018/0262864 A1* | 9/2018 | Reynolds | .............. | G06F 16/254 |

* cited by examiner

*Primary Examiner* — Keshab R Pandey
(74) *Attorney, Agent, or Firm* — Finnegan, Henderson, Farabow, Garrett & Dunner, LLP

(57) ABSTRACT

Described herein are methods, systems, and computer-readable storage media for seamless offline-online execution of applications. Techniques include receiving at a server a request from a client device for execution of an application and then determining one or more subsets of a logic portion of the application. Technique further include distributing the determined one or more subsets of the logic portion of the application to the client device and receiving a set of operations from the client device and an updated state portion of the application. Technique further include authorizing each operation of the set of operations and finalizing the updated state portion of the application.

19 Claims, 9 Drawing Sheets

SYSTEMS AND METHODS FOR EXECUTION IN DYNAMIC APPLICATION RUNTIME ENVIRONMENTS

TECHNICAL FIELD

This disclosure relates to the automatic generation of runtime environments, as well as their management and utilization. More specifically, this disclosure relates to systems and methods for automatic setup of runtime environments and the distribution of application components for execution in runtime environments based on an evaluation of internal and external factors impacting application components.

BACKGROUND

Applications deployed in different environments with different network setups may involve some degree of predetermination of all environments and preparation of code to work in each of the predetermined environments. Such a predetermination of multiple application execution environments, however, makes the software application code rigid, inflexible, and hard to maintain. Further, developers of such applications need to be experts in developing applications to deploy in each of the different environments.

Alternatively, an application developed for a single environment may need to be rewritten to use in another environment. For example, a software application developed to work as a native desktop or mobile application may not have the necessary code to work in a network setup, and vice versa, and an application requiring a network connection may not work in an offline mode as a native application.

Further, developing multiple different applications to run in different environments is costly and time-consuming. These challenges and inefficiencies increase when it comes to maintaining applications for each environment to include the same set of features. Also, independently developed applications for different environments may not have the same user experience. In some cases, further, a user of an application may use the application in specific environments only intermittently, or for a limited set of operations. Additionally, applications developed for specific environments may not have the ability to save partial results to use with the same application across various environments.

Thus, in view of these limitations of applications developed for a single environment or applications rigidly developed for predetermined environments, there are needs for technological solutions to manage the transition of an application or portions of application functionality between different environments. Such solutions should advantageously, as described herein, help avoid the costly, inefficient, inconsistent, and error-prone development of variations of applications for various environments.

Furthermore, there are technological needs to utilize simple techniques, as discussed below, to transition an application or portions of an application between various environments. Also, such solutions should easily be adaptable to various new environments. Further technical improvements are described in the example embodiments below.

SUMMARY

Certain embodiments of the present disclosure relate to a non-transitory computer readable medium, including instructions that when executed by at least one processor, cause the at least one processor to perform operations for server-stateless execution of an application in a customizable runtime environment. The operations may include receiving at a server a request from a client device to initiate execution of the application, sending a state portion of the application to the client device, wherein the state portion of the application includes a set of all variables associated with the application, instantiating one or more instances of a logic portion of the application, requesting a subset of the state portion of the application, wherein the subset of the state portion includes one or more variables of the set accessed by a subset of the logic portion of the application requested for execution, executing the subset of the logic portion of the application using the subset of state portion of the application, and sending an updated subset of the state portion of the application to the client device.

According to some disclosed embodiments, all variables of the application are aggregated in a global namespace.

According to some disclosed embodiments, instantiating one or more instances of the logic portion of the application may further include accessing a pre-configured value of a number of instances of the logic portion of the application and instantiating one or more instances of the logic portion of the application.

According to some disclosed embodiments, the pre-configured value of the number of instances is a static value included with the application.

According to some disclosed embodiments, the pre-configured value of the number of instances is a set of values included with the application.

According to some disclosed embodiments, the set of values is based on one or more factors external to the application.

According to some disclosed embodiments, instantiating one or more instances of the logic portion of the application may further include determining a number of instances of the logic portion of the application based on a number of requests to instantiate execution of the application.

According to some disclosed embodiments, the operations may further include receiving an enclosed state from the client device, wherein the enclosed state is a subset of the state portion that is accessed by an instance of the logic portion of the application based on the received request from the client device.

According to some disclosed embodiments, the executing occurs without a developer of the application specifying a location of the state portion of the application or a location of the logic portion of the application.

According to some disclosed embodiments, the server is configured to specify the subset of the state portion of the application and the subset of the logic portion of the application.

According to some disclosed embodiments, the client device includes at least one of: mobile device, an Internet of Things device, an embedded system, or a computer.

According to some disclosed embodiments, receiving the request for executing the application from the client device may further include receiving the request from a web browser or native application running on the client device.

According to some disclosed embodiments, the web browser or the native application running on the client device includes the display portion of the application, wherein the display portion includes user interface elements used to interact with functions in the logic portion of the application.

According to some disclosed embodiments, the operations may further include updating the display portion of the application based on the updated subset of the state portion of the application.

Certain embodiments of the present disclosure relate to a computer implemented method for server-stateless execution of an application in a customizable runtime environment. The operations may include receiving at a server a request from a client device to initiate execution of the application, sending a state portion of the application to the client device, wherein the state portion of the application includes a set of all variables associated with the application, instantiating one or more instances of a logic portion of the application, requesting a subset of the state portion of the application, wherein the subset of the state portion includes one or more variables of the set accessed by a subset of the logic portion of the application requested for execution, executing the subset of the logic portion of the application using the subset of state portion of the application, and sending an updated subset of the state portion of the application to the client device.

Certain embodiments of the present disclosure relate to a client device. The client device may include one or more memory devices storing processor-executable instructions to perform operations for server-stateless execution of an application in a customizable runtime environment. The operations may include receiving at a server a request from a client device to initiate execution of the application, sending a state portion of the application to the client device, wherein the state portion of the application includes a set of all variables associated with the application, instantiating one or more instances of a logic portion of the application, requesting a subset of the state portion of the application, wherein the subset of the state portion includes one or more variables of the set accessed by a subset of the logic portion of the application requested for execution, executing the subset of the logic portion of the application using the subset of state portion of the application, and sending an updated subset of the state portion of the application to the client device.

Additional disclosed embodiments relate to a non-transitory computer readable medium, including instructions that when executed by at least one processor, cause at least one processor to perform operations for seamless offline-online execution of applications. The operations may include receiving at a server a request from a client device for execution of an application, determining one or more subsets of a logic portion of the application, distributing the determined one or more subsets of the logic portion of the application to one or more client devices, receiving a set of operations from a client device and an updated state portion of the application, and authorizing each operation of the set of operations and finalizing the updated state portion of the application.

According to some disclosed embodiments, determining the one or more subsets of the logic portion of the application may further include identifying subsets of the logic portion of the application that can execute offline, wherein the identified subsets of the logic portion of the application can execute on the client device, and including the identified subsets of the logic portion in the one or more subsets of the logic portion of the application.

According to some disclosed embodiments, distributing the determined one or more subsets of the logic portion of the application to the client device may further include sending a state portion of the application to the client device, wherein the state portion of the application includes a set of all variables associated with the application.

According to some disclosed embodiments, receiving the set of operations from the client device may further include receiving one or more offline operations of the one or more subsets of the logic portion of the application executed on the client device when the client device was offline, and replaying each operation of the one or more offline operations as requests for execution of the application from the client device.

According to some disclosed embodiments, authorizing the each operation of the set of operations and finalizing the updated state portion of the application may further include validating each operation of the set of operations based on: an accessed subset of the state portion of the application, an executed subset of the logic portion of the application, a user of the client device requesting execution of the application, and an order of the set of operations, and approving updates to subsets of the state portion when the operation of the set of operations is valid, wherein approved updates to the subsets of the state portion of the application are included in the updated state portion of the application.

According to some disclosed embodiments, the updated state portion of the application may include the accessed subset of the state portion of the application.

According to some disclosed embodiments, the updated state portion of the application may include a subset of the state portion of the application, wherein the subset of the state portion of the application includes the updated values.

According to some disclosed embodiments, the updated values include addition, deletion, and modification of the values.

According to some disclosed embodiments, the operations may further include sending the finalized updated state portion of the application to the client device.

Certain embodiments of the present disclosure relate to a computer implemented method for seamless offline-online execution of applications. The operations may include receiving at a server a request from a client device for execution of an application, determining one or more subsets of a logic portion of the application, distributing the determined one or more subsets of the logic portion of the application to the client device, receiving a set of operations from the client device and an updated state portion of the application, and authorizing each operation of the set of operations and finalizing the updated state portion of the application.

Certain embodiments of the present disclosure relate to a client device. The client device may include one or more memory devices storing processor-executable instructions for seamless offline-online execution of applications. The operations may include receiving at a server a request from a client device for execution of an application, determining one or more subsets of a logic portion of the application, distributing the determined one or more subsets of the logic portion of the application to the client device, receiving a set of operations from the client device and an updated state portion of the application, and authorizing each operation of the set of operations and finalizing the updated state portion of the application.

Additional disclosed embodiments relate to a non-transitory computer readable medium including instructions that, when executed by at least one processor, cause the at least one processor to perform operations for automatic selection of a runtime environment for execution of an application. The operations may include identifying the application at a server for execution in a runtime environment, accessing a state portion and a logic portion of the application, and selecting the runtime environment by determining a location scenario of the state portion and the logic portion of the application, wherein the location scenario is at least one of: the state portion and the logic portion of the application are present on the server, the state portion is sent to a client device by the server and the logic portion is present on the server, the logic portion is sent to the client device by the server and the state portion is present on the server, or the state portion and the logic portion of the application are sent to the client device by the server.

According to some disclosed embodiments, selecting the runtime environment may further include determining the state portion of the application will exceed a resources threshold.

According to some disclosed embodiments, selecting the runtime environment may further include determining the state portion of the application should only be present on the server based on security or compliance requirements.

According to some disclosed embodiments, determining the location scenario may further include identifying a connectivity status of the application over a time period.

According to some disclosed embodiments, the operations may further include determining a plurality of runtime environments in which to execute the application at different times.

According to some disclosed embodiments, the plurality of runtime environments includes a runtime environment where the state portion and the logic portion of the application are present on the server.

According to some disclosed embodiments, the plurality of runtime environments includes a runtime environment where the state portion is present on the server and the logic portion is present on the client device.

According to some disclosed embodiments, the plurality of runtime environments includes a runtime environment where the state portion is present on the client device and the logic portion is present on the server.

According to some disclosed embodiments, the plurality of runtime environments includes a runtime environment where the state portion and the logic portion of the application are present on the client device.

According to some disclosed embodiments, determining the plurality of runtime environments in which to execute the application at different times may further include copying the state portion and the logic portion of the application from the server to the client device to enable the execution of the application in the absence of a network connection between the server and the client device.

According to some disclosed embodiments, determining the plurality of runtime environments is based on scalability requirements received by the server along with the application.

Certain embodiments of the present disclosure relate to a computer implemented method for automatic selection of a runtime environment for execution of an application. The operations may include identifying the application at a server for execution in a runtime environment, accessing a state portion and a logic portion of the application, and selecting the runtime environment by determining a location scenario of the state portion and the logic portion of the application, wherein the location scenario is at least one of: the state portion and the logic portion of the application are present on the server, the state portion is sent to a client device by the server and the logic portion is present on the server, the logic portion is sent to the client device by the server and the state portion is present on the server, or the state portion and the logic portion of the application are sent to the client device by the server.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms and passive forms of sending and receiving.

Systems and methods consistent with the present disclosure are directed to automatic management, optimization, and utilization of runtime environments. In some embodiments, the automated management of runtime environments may include options for identifying required or preferred runtime environments based on the physical environment of execution of an application, user requirements, etc. As described below, these techniques of automatic runtime environment management result in technological improvements in enhancing the ability to work in different physical environments and changing user requirements seamlessly.

Figure 1:
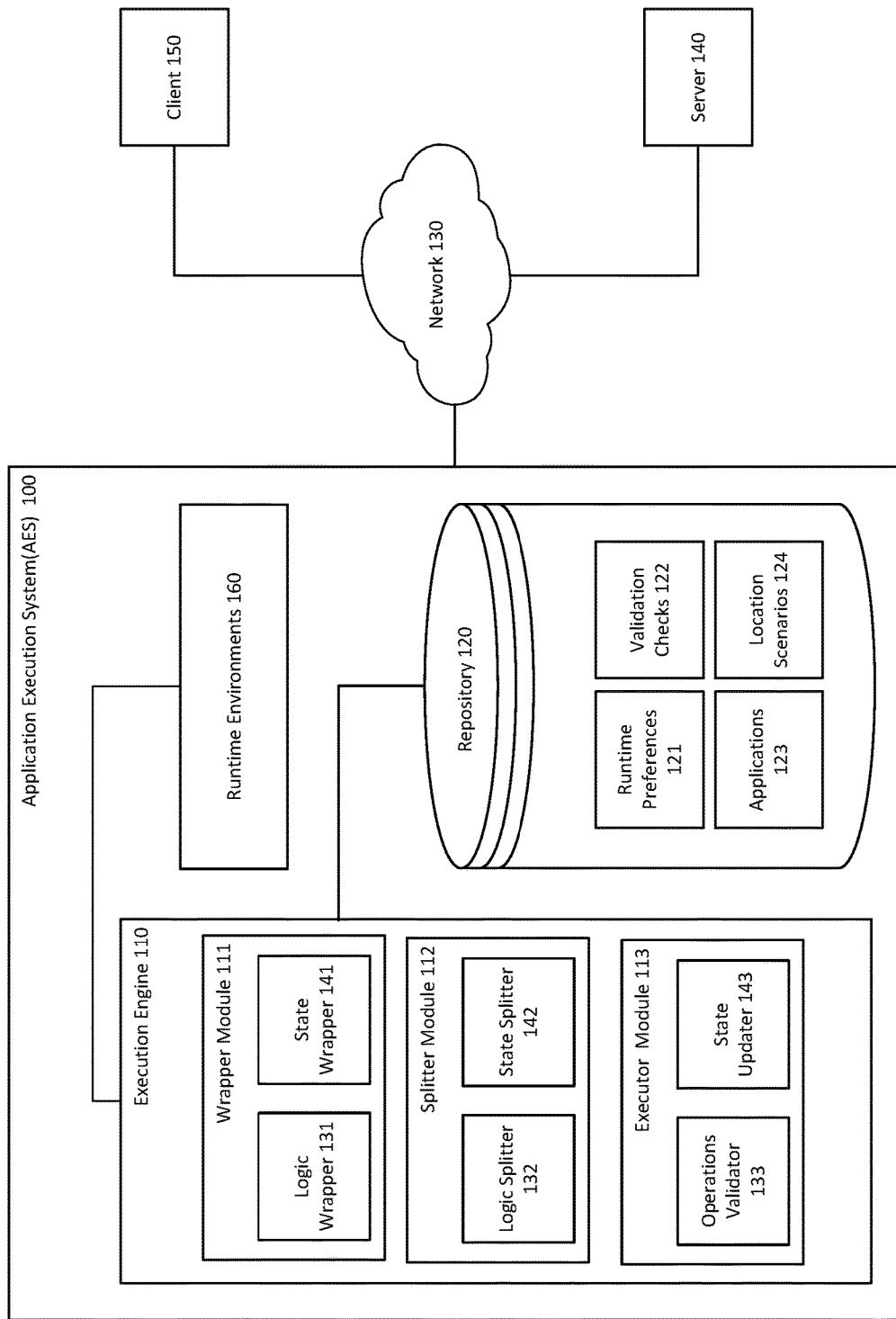
FIG. 1 is a block diagram depicting an exemplary system to generate runtime environments automatically, according to some embodiments of the present disclosure.

FIG. 1 is a block diagram depicting an exemplary system to generate runtime environments automatically, according to some embodiments of the present disclosure. Application execution system (AES) 100 may help generate and select various possible runtime environments 160 for executing applications 123. As illustrated in FIG. 1, AES 100 contains execution engine 110 and repository 120 to help generate and manage runtime environments 160 for executing applications 123. AES 100 may generate runtime environments 160 based on runtime preferences 121 and select runtime environments 160 based on location scenarios 124. AES 100 may allow applications 123 to execute in a plurality of runtime environments 160 that are eligible for executing applications 123. In some embodiments, AES 100 may generate and execute multiple applications in parallel in multiple runtime environments. For example, the multiple applications may be multiple copies of the same applications running in parallel in multiple runtime environments 160. Multiple users requesting access to the same services or features of an application of applications 123 may result in each runtime environment of multiple runtime environments 160 executing a copy of the application providing access to the requested services or features. In some embodiments, AES 100 may also execute different portions of an application simultaneously in different runtime environments 160. In some embodiments, AES 100 may utilize multiple runtime environments 160 of different configurations for executing applications 123 simultaneously. For example, a user executing an application of applications 123 outside a company network may result in a runtime environment where the application runs on a secure server and provides result data to the user. Simultaneously, a second user requesting execution of the same application may result in a local runtime environment on the requesting computing instance (e.g., client 150) to execute the application.

In some embodiments, certain data in the state portion of an application or operations in the logic portion of an application should not be transmitted to client 150 to protect against access to or manipulation of such data. For example, data in the state portion may be required for processing, but the underlying data itself may not be available to client 150 and a user of client 150. In some embodiments, a compliance requirement set by an application owner or a user might limit or restrict transmission of data representing the state portion of the application from server 140 to client 150. The compliance requirements may be implemented based on, for example, data privacy regulations (e.g., HIPAA, GDPR, etc.) or certain industries such as banking and finance that want to control all their data accessed by an application to certain networks (e.g., network 130) and computing instances (e.g., server 140).

AES 100 may seamlessly transition execution of applications 123 between runtime environments 160 of different configurations. AES 100 may help transition between runtime environments 160 based on changes to the needs of an application executed by AES 100. For example, AES 100 may transition the execution of an application to a runtime environment with more computing and storage resources for certain portions of an application based on the resource needs of an application. In another example, AES 100 may utilize a runtime environment to execute an application or a portion of an application offline and verify the executed operations of the application portion upon going online.

Execution engine 110 of AES 100 may generate runtime environments 160 for executing applications 123 using other information in repository 120. In some embodiments, execution engine 110 may receive additional information from external sources to generate runtime environments 160. Execution engine 110 may generate runtime environments 160 by evaluating applications 123. Execution engine 110 may evaluate an application, for instance, to determine the locations of portions of application code representing operations on data, called a logic portion, and variables storing data, called a state portion. Execution engine 110 may identify locations of logic potions of an application as a list of various functions and file or class paths of various functions. Execution engine 110 may utilize other information such as runtime preferences 121 associated with application 123 and available location scenarios 124 to generate runtime environments 160. Execution engine 110 may store details of logic and state portion of applications 123 in runtime environments 160. In some embodiments, execution engine 110 may persist determined logic and state portions of applications in repository 120. Runtime environments 160 are transient processes running on a computing instance (e.g., server 140, client 150) to execute portions of applications 123 and manage data needed and generated by applications 123. Runtime environments 160 may cease to exist upon completion of execution of applications 123.

Execution engine 110 may transform the determined logic and state portions of applications 123 to generate runtime environments 160 for executing applications 123. The transformations may include wrapping state and logic portions of applications 123 with additional code. For example, a wrapped logic portion of an application may transform access to different variables storing data into network calls to another computing resource that maintains a state portion of an application. In another example, a wrapped state portion of an application may include the migration of variables utilized by a logic portion of an application into a global namespace for lookup based on access requests from the logic portion of the application.

As illustrated in FIG. 1, execution engine 110 contains wrapper module 111, splitter module 112 to generate and manage runtime environments 160, and executor module 113 to execute applications 123 in runtime environments 160. Wrapper module 111 may help identify and manage logic and state portions of an application requested for execution using AES 100. Wrapper module 111 includes logic wrapper 131 and state wrapper 141 to wrap logic and state portions of the application with additional code to execute in various runtime environments 160. Logic wrapper 131 may help wrap a logic portion of an application by accessing some or all statements in an application's code for processing data in variables. Logic wrapper 131 may replace variables in the statements processing data in variables with calls to a computing resource storing variables to access data associated with variables. Logic wrapper 131 may make access to certain variables include an authentication check to securely execute an application. For example, an application execution outside a company network may be considered unsecure and require each request to process data in the logic portion to be preceded by an authentication check. In some embodiments, logic wrapper 131 may mark statements of the logic portion of the application that need authorization verification before finalizing the updates to processed data. The authorization verification checks may be queued when executing the logic portion and checked at a later time. For example, an application executing offline may result in statements in the logic portion processing data to be verified to check if the user executing the application is authorized to access and update the data and perform the operations in the logic portion of the application.

State wrapper 141 identifies a state portion of an application by identifying all variables and classes that store function parameters data, intermediate results data, and function return values data. State wrapper 141 may help wrap a state portion of an application by storing identified variables and classes in a global namespace. State wrapper 141 may generate a hash data structure to manage access to variables in a global namespace. State wrapper 141 may maintain a unique hash key for each variable or class name in a global namespace. State wrapper 141 may make each variable or class name unique using the path to the variable or class. For example, a variable "bar" in a function "foo" may be renamed as "foo.bar" and used as a hash key to map to the contents of the variable "bar." In another example, state wrapper 141 may rename a variable "bar" in a class "baz" as "baz.bar." In some embodiments, a hash key may include a function name hierarchy to identify an application's variables uniquely. The hierarchy of functions may represent the path of function calls to access an application's variables. In some embodiments, a hierarchy of function names may include a file name that includes a function and a folder name that includes the file. Logic wrapper 131 may work with state wrapper 141 to wrap the logic portion of an application by renaming variables identified as the state portion of an application using updated names used as a hash key in API calls to access the contents of variables.

State wrapper 141 may also aid in unwrapping a previously wrapped state portion of an application code to provide to a logic portion of an application. For example, a variable transitioned to a global namespace as part of a transformation of a state portion may be unwrapped to move it to a local space of a function in a logic portion of an application. Similarly, logic wrapper 131 may unwrap a previously wrapped logic portion by replacing API calls to access variable names with local variable names.

Logic wrapper 131 and state wrapper 141 may dynamically transform part of an application code for execution using AES 100. Wrapper module 111 may act automatically on observing new application code. For example, AES 100 may be integrated with a continuous integration/continuous delivery (CI/CD) system and automatically determine a runtime environment of updated/new application code upon a developer committing a code to a version control system (e.g., CVS, SVN, GIT, Bazaar, etc.). In some embodiments, wrapper module 111 may identify a logic and state portion of an application for execution in a runtime environment based on an execution request received by AES 100. For example, wrapper module 111 may review a RESTful call with a URL to identify a function in application code and determine the logic and state portion of the identified function of an application.

AES 100 may execute applications 123 in different runtime environments 160 at different points in time. AES 100 may transition an application between various runtime environments 160 based on the runtime preferences 121 associated with an application. Runtime preferences 121 may include connectivity, computing resource, scale, security, or compliance requirements of applications 123 over a period of time. Splitter module 112 may split logic and state portions of an application previously determined using wrapper module 111 to transition between different runtime environments. In some embodiments, splitter module 112 may split a state portion of an application to share with a logic portion requesting access to the content of variables in the split state portion. As illustrated in FIG. 1, splitter module 112 may include logic splitter 132 and state splitter 142 to split logic and state portions of applications.

Logic splitter 132 may split a logic portion of an application for execution on a computing instance associated with a runtime environment of runtime environments 160. Logic splitter 132 may split a logic portion of an application to execute in a new runtime environment based on the updated execution requirements of an application. For example, logic splitter 132 may split a logic portion to be placed in the same computing instance (e.g., client 150) as the state portion of an application to execute an application offline. Logic splitter 132 may split a logic portion of an application based on runtime preferences 121 that include various execution requirements of an application. Split portions of a logic portion of an application may include overlapping code that may execute in different runtime environments 160 at different times of execution of an application. In some embodiments, logic splitter 132 may identify split portions of application logic that may execute in different environments based on the historical execution activity of an application. For example, logic splitter 132 may identify portions of application logic that may execute offline on a user device (e.g., client 150). Logic splitter 132 may identify offline executable portions of an application based on physical locations of execution of the application. For example, logic splitter 132 may determine low connectivity locations and split portions of application code that can execute offline using splitter module 112. AES 100 may identify offline locations based on prior execution requests of an application. AES 100 may split a portion of an application code by identifying operations of the application requested in low connectivity locations. AES 100 may include both logic and state portions of the application in split portions of an application code executed in low connectivity locations.

State splitter 142 may split a state portion to execute an application in multiple runtime environments. For example, a state portion of an application provided as input to a logic portion of an application executing in an iterative manner may be split to execute multiple copies of a logic portion with each state portion entry in parallel in a separate runtime environment. State splitter 142 may split a state portion of an application to provide specific variables currently accessed by a logic portion of an application executing on a runtime environment of runtime environments 160.

State splitter 142 may help identify a subset of a state portion of an application identified by state wrapper 141. State splitter 142 may identify all the variables requested by a statement in a logic portion of an application and provide for accessing data returning results to store in a state portion of an application.

Executor module 113 aids in executing a portion of an application or an entire application in a runtime environment previously generated using wrapper module 111. Executor module 113 may both initiate and manage the execution of an application. Executor module 113 may receive information about an application and eligible runtime environments for executing an application. Executor module 113 may instantiate instances of state and logic portions of an application identified by wrapper module 111. Executor module 113 may instantiate instances of state and logic portions of an application by allocating computing resources to execute a logic portion of an application. Executor module 113 may allocate computing resources by initiating new compute instances on a cloud service provider (e.g., Amazon AWS™, Microsoft Azure™ Google Cloud™, etc.). As illustrated in FIG. 1, executor module 113 may include operations validator 133 to help validate the changes to the contents of variables and state updater 143 to update the contents of variables forming the state portion of an application.

State updater 143 may work in tandem with state splitter 142 to receive updates of split portions of a state portion of an application sent to a logic portion for accessing the contents of variables. State updater 143 may receive a subset of a split portion of application state shared with application logic that has been updated and no longer needed by application logic.

Operations validator 133 may validate updates to state portion variables updated by application logic. For example, operations validator 133 may validate state portion updates by re-executing the operations of a logic portion of an application that caused the update to start. Operations validator 133 may validate state updates that occurred when an application was executed offline and use the state portion available directly without requesting access to a location with the stored state portion of the application.

Repository 120 is a data storage to store applications 123 and various metadata to generate execution environments and validate executed operations of applications 123. In various embodiments, repository 120 may take several different forms. For example, repository 120 may be a SQL database or NoSQL database, such as those developed by REDIS, ORACLE, CASSANDRA, MYSQL, KDB+, or various other types of databases. Accordingly, repository 120 may be a relational or non-relational database, a row database, or a columnar database. In addition, repository 120 may be distributed across multiple physical servers or centralized at a single server.

Repository 120 may store data used in the operation of applications, such as execution engine 110. For example, execution engine 110 may determine runtime environments for executing a requested software application function by reading runtime preferences 121 and location scenarios 124 and generating runtime environments 160. In some embodiments, repository 120 may be fed data from an external source (e.g., server, database, sensors, IoT devices, etc.). The external data may be copied into repository 120 or pointed in database tables in repository 120. For example, repository 120 may include URLs to remote data stored on a file system or cloud storage (e.g., AMAZON S3, AZURE STORAGE, GOOGLE CLOUD STORAGE, etc.). The external data may be accessed directly over a network protocol (e.g., HTTP) or may require the usage of an API.

Runtime preferences 121 store configuration details of various possible execution requirements of applications 123. AES 100 may utilize runtime preferences 121 associated with an application to generate runtime environments 160 to execute applications 123. Runtime preferences 121 may include rules for the execution of an application. In some embodiments, rules may include specific types of computing resources or network connectivity requirements. For example, runtime preferences 121 may list the amount of computing power needed to execute a portion of an application and/or whether a portion of an application can execute online. Execution engine 110 may use runtime preferences and location scenarios 124 to generate runtime environments 160 to execute applications 123.

AES 100 may receive and store runtime preferences 121 submitted along with a request to execute an application of applications 123. AES 100 may identify runtime preferences 121 dynamically with every new request for execution of an application or in a static manner when storing an application in applications 123. In some embodiments, AES 100 may automatically determine runtime preferences 121 of applications 123. For example, AES 100 may determine runtime preferences 121 based on historic execution requests of an application.

Validation checks 122 may include a list of operations present in portions of applications 123 to be validated after an offline execution. AES 100 may perform validation checks 122 to confirm the final value of a state portion of applications 123 accessed offline. Operations validator 133 may use validation checks 122 to determine whether the operations in an application resulting in an updated state portion of an application are valid. AES 100 may receive a list of operations of an application in applications 123 to store in validation checks 122. Validation checks 122 may be set dynamically along with every new request to execute a portion of an application. In some embodiments, AES 100 may set validation checks 122 statically along with a request to include an application in applications 123. AES 100 may determine validation checks 122 automatically based on runtime preferences 121, including the ability to execute offline or with limited connectivity.

Applications 123 may include software code executed in runtime environments 160 generated by execution engine 110. Applications 123 may point to file locations or include a mapping of various classes and functions. Execution engine 110 may review code in applications 123 to determine logic and state portions of each application of applications 123. Applications 123 may include the logic and state portions of each application of applications 123 determined by execution engine 110. In some embodiments, applications 123 may be only the logic portion of each application.

Location scenarios 124 may include various ways an application of applications 123 may execute over a period of time. AES 100 may use location scenarios 124 to help generate a runtime environment of runtime environments 160 to execute an application. AES 100 may determine location scenarios 124 based on the historic execution behavior of applications 123. Location scenarios 124 may identify various possible ways a portion of an application of applications 123 may execute based on available computing and network connected resources. In some embodiments, location scenarios 124 may also identify the security, compliance, and scaling requirements of an application. AES 100 may map requested runtime preferences 121 to available location scenarios 124 to identify the best match computing environment to execute an application. Location scenarios 124 may include a complete list of ways applications 123 may execute on available computing resources. For example, location scenarios 124 may define all possible ways applications 123 may execute using server 140 and client 150. For example, location scenarios may include executing an application only on server 140, client 150, or a combination for portions of an application. In some embodiments, applications 123 may share location scenarios 124.

Runtime environments 160 may include configurations of applications 123 to execute in various location scenarios 124. Runtime environments 160 may include logic and state portions of applications 123 determined by execution engine 110. Runtime environments 160 may include multiple copies of logic and state portions of an application to match the various location scenarios 124 associated with an application. Location scenarios 124 may aid AES 100 to generate multiple instances of runtime environments 160 based on a location scenario of location scenarios 124 describing ways to handle increased load with a scaling number of runtime environment instances. For example, multiple copies of runtime environments 160 may be generated based on location scenarios when the server is scaled up (e.g., replicas that handle increased load). In some embodiments, location scenarios 124 may aid AES 100 to generate multiple copies of runtime environments 160 based on a location scenario describing a client-server execution setup. For example, in a client-server setup two copies of runtime environments 160, one running on server 140 and other copy running on client 150, may be generated and execute an application of application 123. In the example location scenario, each copy of runtime environment 160 may include a copy of logic and state portions for an application. In some scenarios, a copy of runtime environment 160 may only include either a state portion or a logic portion of an application. In another example, a location scenario 124 may define an application accessed by multiple users simultaneously in separate sessions requiring multiple copies of runtime environments, one per each user session. In some scenarios, multiple copies of runtime environments 160 may include different logic portions but share a single state portion on a server (e.g., server 140). For example, multiple users may connect using clients (e.g., client 150) connected to the same application for real-time collaboration (such as, e.g., Google Docs™, etc.), which results in multiple copies of the logic portion executing in multiple copies of the runtime environment on each client and a single common state portion of the application managed in one runtime environment on a server.

In some embodiments, runtime environments 160 may include the determined logic and state portions of applications 123 along with details of computing resources, storage resources, and network layout of computing and storage resources. Runtime environments 160 may persist these details to repository 120. In some embodiments, runtime environments 160 may include information about a type of computing resource to execute a logic portion of an application. For example, a runtime environment may describe a computing resource offered by a cloud provider but not a specific instantiated computing instance on the cloud with an IP address. In some embodiments, AES 100 may use runtime preferences 121 to identify previously generated runtime environments 160 to execute applications 123.

Figure 2:
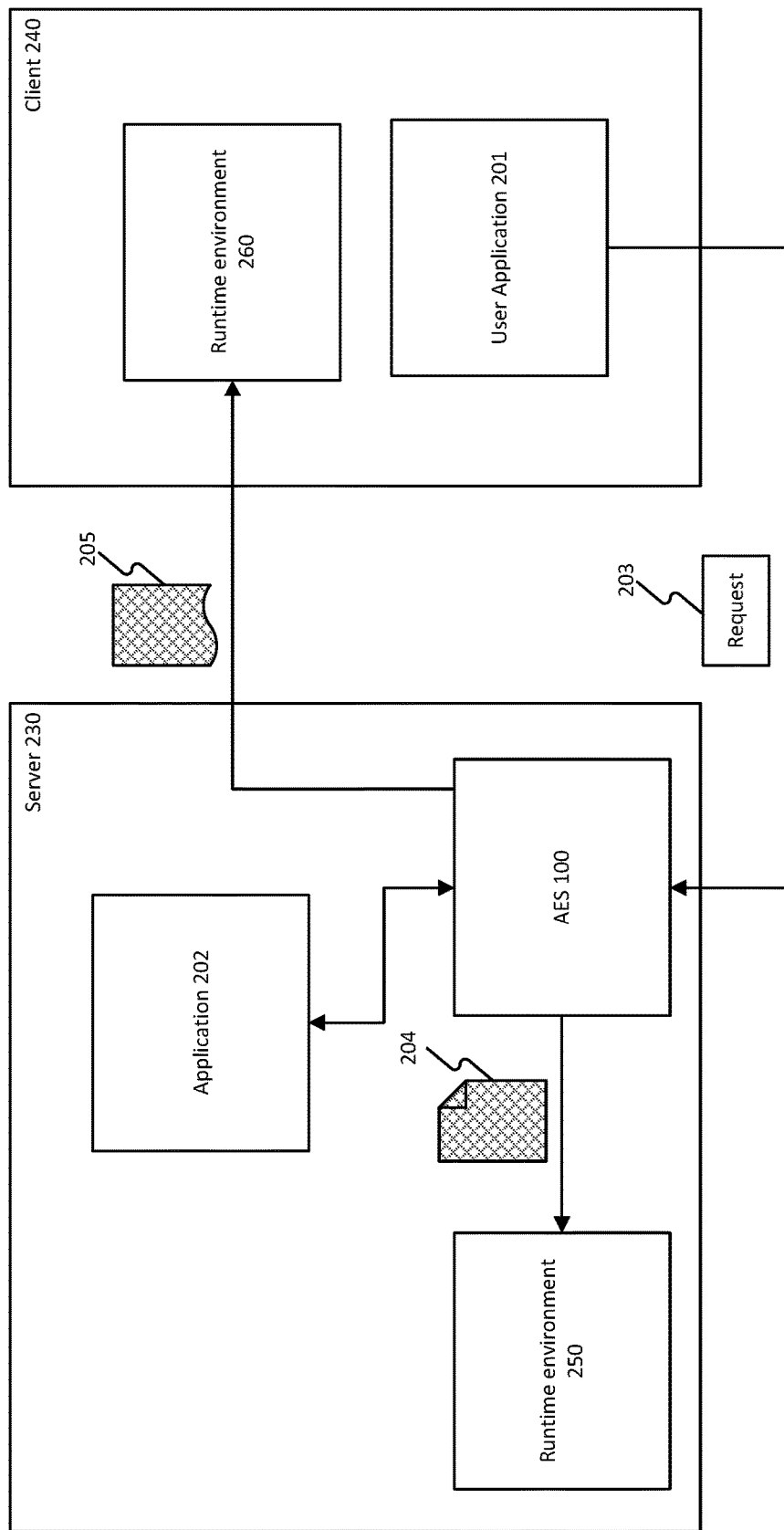
FIG. 2 is a block diagram of an exemplary system consistent with FIG. 1 to handle the execution of an application in a dynamic runtime environment, according to some embodiments of the present disclosure.

AES 100 may optionally receive requests to execute applications 123 and distribute logic and a state portion of an application via a network 130 to run in runtime environments 160 on server 140 and client 150. In some embodiments, client 150 and server 140 may transfer the latest version of a state portion of an application over network 130. Network 130 may take various forms. For example, network 130 may include or utilize the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or various other types of network communications. In some embodiments, network 130 may include an on-premises (e.g., LAN) network, while in other embodiments, network 130 may include a virtualized network, e.g., AWS™, AZURE™, IBM CLOUD™, etc. Further, network 130 may, in some embodiments, be a hybrid on-premises and virtualized network FIG. 2 is a block diagram of an exemplary system consistent with FIG. 1 to handle the execution of an application in a dynamic runtime environment, according to some embodiments of the present disclosure. As illustrated in FIG. 2, application execution system (AES) 100 manages the execution of an application 202 in a dynamic runtime environment, including server 230 and client 240. AES 100 manages the execution by determining an application's logic 204 and state 205 portions and sending them to the same or multiple separate computing devices. AES 100 may dynamically transmit logic portion 204 and state portion 205 to server 230 and client 240.

As an illustration, AES 100 may be a software component executing on server 230 in a client-server architecture. AES 100 may execute application 202 on server 230 upon receiving request 203. AES 100 and application 202 may both execute simultaneously on server 230. For example, AES 100 may be part of a web application server (e.g., Apache Tomcat Server) to help execute application 202 on server 230. In some embodiments, AES 100 may retrieve application 202 upon receiving request 203. AES 100 may receive application 202 over network 130. AES 100 may receive request 203 from user application 201 to access application 202. AES 100 may execute one or more operations in application 202 to provide output for an access request from user application 201.

User application 201 may be a software component running on client 240. User application 201 may be an application for accessing application 202. For example, user application 201 may be a web browser used by a user on a client device (e.g., mobile phone, laptop, desktop, etc.) to place requests to access application 202. In another example, user application 201 may be a server making API requests to access application 202. In some embodiments, request 203 may be sent by a by a third-party. Request 203 also may be triggered automatically by occurrence of an event. For example, a scheduled time of the day, etc., can be a trigger causing a request 203 to be sent to AES 100.

In some embodiments, request 203 may be sent to AES 100 without a developer of the application 202 having specified locations of particular state portions or logic portions of the application 202. In this way, the developer does not necessarily need to specify a particular execution environment for execution of the application. Instead, consistent with below embodiments, AES 100 can determine what state portions and logic portions of the application 202 to place on server 230 and client 240 for execution of application 202. Accordingly, the application 202 and its user interface may be agnostic as to the mode of execution of the application 202. Of course, in other embodiments a developer may wish to specify the location of particular state portions and logic portions of the application. In that situation, the developer may indicate those portions to AES 100 (e.g., as part of the process of building application 202, configuring application 202, instantiating application 202, replicating application 202, etc.).

Application 202 may be an application of applications 123 stored in repository 120, as shown in FIG. 1. User application 201 may cause execution of application 202 by sending request 203 to AES 100. User application 201 may run on client 240 and request execution of application 202. In some embodiments, user application 201 may run on a third device to initiate an application execution request to execute application 202 using server 230 and client 240.

Request 203 may identify application 202 by name and the location of executable code. In some embodiments, request 203 may include a function's name in application 202. In some embodiments, AES 100 may identify the file path of an executable file or function based on request 203. For example, request 203 containing a URL path may be transformed by a web application server, such as AES 100, using routing rules.

AES 100 may split application 202 into a state and a logic portion to execute a requested portion of application 202. In some embodiments, AES 100 may have split application 202 into state and logic portions. AES 100 may then transmit state portion 205 of application 202—which may be some or all of the state portion of application 202—to client 240 upon receiving request 203 to execute application 202. State portion 205 may include all variables used to store inputs, intermediate results, and final output. In some embodiments, AES 100 may persist state portion 205 later to a file or a database (e.g., repository 120) to use for future requests to execute application 202. In some embodiments, AES 100 may determine state portion 205 of application 202 in real-time before transmitting it to client 240. In some embodiments, AES 100 may determine and prepare state portion 205 of application 202 using wrapper module 111, as described in FIG. 1 above. AES 100 may copy variables in the global namespace prepared by wrapper module 111 and transmit them as state portion 205. In some embodiments, AES 100 may create a new namespace of variables associated with request 203 and share them as state portion 205. AES 100 may use splitter module 112 to determine a portion of variables in the global namespace to send as state portion 205 to client 240.

State portion 205 may include variables used by operations in application 202 identified in request 203 for execution by user application 201. In some embodiments, state portion 205 may include variables related to additional functionality in application 202 predicted by AES 100 to be part of a future request by user application 201.

AES 100 may transmit logic portion 204 of application 202 to runtime environment 250 in server 230. The logic portion 204 may be received and executed in runtime environment 250. Server 230 may be a set of computing instances to execute logic portion 204. Server 230 may be the same computing instance on which AES 100 is running or an additional set of instances for executing logic portion 204 of application 202. Runtime environment 250 may represent one instance of a set of instances executing logic portion 204. AES 100 may communicate with runtime environment 250 in server 230 by locally calling a function with a link to logic portion 204. In some embodiments, AES 100 may communicate over network 130 with additional computing instances in server 230 representing runtime environment 250. In some embodiments, AES 100 may transmit different logic portions (e.g., logic portion 204) to different instances of servers (e.g., server 230) based on portions that can be executed in parallel. In some embodiments, AES 100 may pre-transmit logic portion 204 to runtime environment 250 before a request to execute operations in logic portion 204. AES 100 may pre-transmit logic portion 204 of application 202 based on an evaluation of often executed operations of application 202. In some embodiments, AES 100 may pre-transmit logic portion 204 including operations executed along with requested operation in request 202.

Logic portion 204 may include operations in application 202 requested for execution by user application 201. In some embodiments, logic portion 204 may include additional functionality in application 202 predicted by AES 100 to be part of a future request by user application 201. Such a prediction may be made, for example, based on machine learning techniques that analyze previous requests and/or user application 201's activity with respect to the requests.

In some embodiments, state portion 205 may be transmitted to server 230 and logic portion 204 to client 240 for executing operations in logic portion 204 on client 240. AES 100 may transmit state portion 205 to runtime environment 250 in server 230 to have multiple clients working collaboratively to share the state portion of application 202. For example, an application for editing a collaborative document may include a state portion (e.g., state portion 205) of different pages of the collaborative document on server 230 and multiple clients (e.g., client 240) accessing the same collaborative document in state portion 205.

In some embodiments, AES 100 may vary the distribution of logic portion 204 and state portion 205 over time by sending them to runtime environments on server 230 and/or client 240 based on the conditions of the request for execution of application 202. For example, AES 100, upon predicting a low connectivity condition, may send both logic portion 204 and state portion 205 to client 240 to execute an application offline. In another example, AES 100, upon detecting a low connectivity condition, may send both logic portion 204 and state portion 205 to runtime environment 250 in server 230 and only send results to client 240 to reduce the usage of a connection network (e.g., network 130 of FIG. 1) between client 240 and server 230 to share the latest version of state portion 205. A detailed description of the distribution of logic and state portion of an application to a single computing device is provided in FIG. 4 below.

Figure 3:
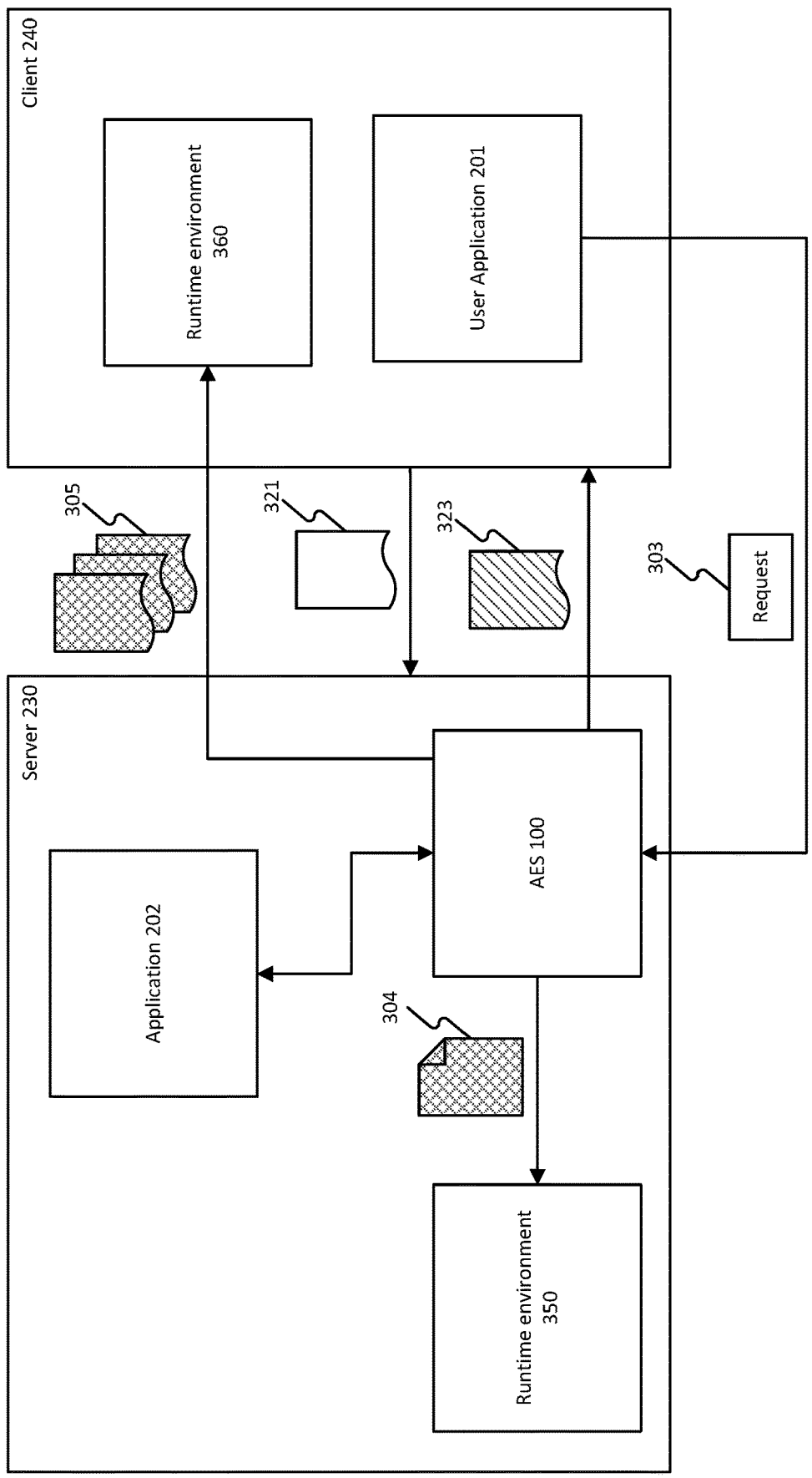
FIG. 3 is a block diagram of an exemplary system consistent with FIG. 1 to manage a state portion of an application executing in a dynamic runtime environment, according to some embodiments of the present disclosure.

Server 230 and client 240 computing devices may communicate directly by, for example, sharing a subset of state portion 205. As illustrated in FIG. 3, client 240 may transmit subset 321 of current values in state portion 205 to server 230 to use as input, generate intermediate results, and store the final output. In some embodiments, server 230 and client 240 may be the same computing device. For example, a web-based application accessed locally using a web browser on the same device running a web application server may result in the same computing device acting as server 230 and client 240.

FIG. 3 is a block diagram of an exemplary system consistent with FIG. 1 to manage a state portion of an application executing on a dynamic runtime environment, according to some embodiments of the present disclosure. As illustrated in FIG. 3, AES 100 manages state portion 305 by determining and transmitting it to client 240 and accessing subsets for executing operations in logic portion 304. As discussed above, a developer does not need to specify the location of state portion 305 or logic portion 304 before the application is executed. Instead, AES 100 may determine the location of appropriate state portion 305 and logic portion 304 to execute the application.

AES 100 may manage state portion 305 based on request 303 from user application 201 to access and execute some or all of application 202. AES 100 may use request 303 to identify application 202 and generate a runtime environment (e.g., runtime environment 350, 360) and operations to execute in the generated runtime environment. Request 303 may include runtime preferences (e.g., runtime preferences 121 of FIG. 1) to determine runtime environment setup to execute operations in application 202. As illustrated in FIG. 3, AES 100 may determine a client-server setup of a runtime environment to execute operations of application 202 on server 230 using data stored on client 240. AES 100 may determine the runtime environment by determining logic portion 304 and state portion 305 in application 202. Wrapper module 111 (as shown in FIG. 1) may generate logic portion 304 and state portion 305 of application 202. Logic portion 304 may include all operations in application 202's code or a subset of operations based on request 303. State portion 305 may include all variables storing data used as input and store interim and final results. In some embodiments, state portion 305 may only include variables relevant for operations in logic portion 304. AES 100 may include a machine learning model to predict additional operations that may be requested in the future and included in logic portion 304 and additional data needed in state portion 305.

AES 100 may generate a runtime environments 350 and 360 by distributing logic portion 304 and state portion 305 to server 230 and client 240, respectively. AES 100 may run on server 230 and monitor the execution of operations in logic portion 304 on runtime environment 350 in server 230. AES 100 may split a subset state 321 from state potion 305 transmitted to client 240 to use with an operation in logic portion 304. State splitter 142 may help split subset state 321 from state portion 305 for use by logic portion 304.

AES 100 may aid transmission of subset state 321 of stored state portion 305 in client 240 to server 230. Runtime environment 360 in client 240 may manage state portion 305 of application 202. AES 100 may run on runtime environment 350 in server 230, operations in logic portion 304 using data in variables in subset state 321. Subset state 321 may include variables acting as containers to return values of an updated state to share with other operations in application 202 and future executions of logic portion 304. AES 100 may transmit updated values in variables as updated state 323 to client 240 for runtime environment 360 to update and manage state portion 305. AES 100 may direct server 230 to transmit updated state 323 to client 240. Server 230 may transmit updated state over network 130. AES 100 may help transmit updated state 323 to client 240 immediately on completion of execution of operations in logic portion 304. In some embodiments, AES 100 may be configured to send updated state 323 on meeting triggered conditions. Trigger conditions may include the number of executed operations, number of times of execution of logic portion 304, and amount of time of execution of operations of logic portion 304. A user of AES 100 may manually set trigger conditions for transmitting updated state 323. In some embodiments, users may share trigger conditions with request 303 to access application 202. In some embodiments, AES 100 may automatically determine trigger conditions and adjust them based on past execution requests and configured trigger condition values set by users of AES 100. Client 240 may merge updated state 323 with state portion 305. AES 100 may help merge the updated state by replacing some of the deleted and updated values in state portion 305 with values in updated state 323. In some embodiments, updated state 323 may be added as additional data in state portion 305, for example, new rows in a table. AES 100 may persist merged state portion 305 to repository 120 and use it in future requests to execute logic portion 304.

Figure 4:
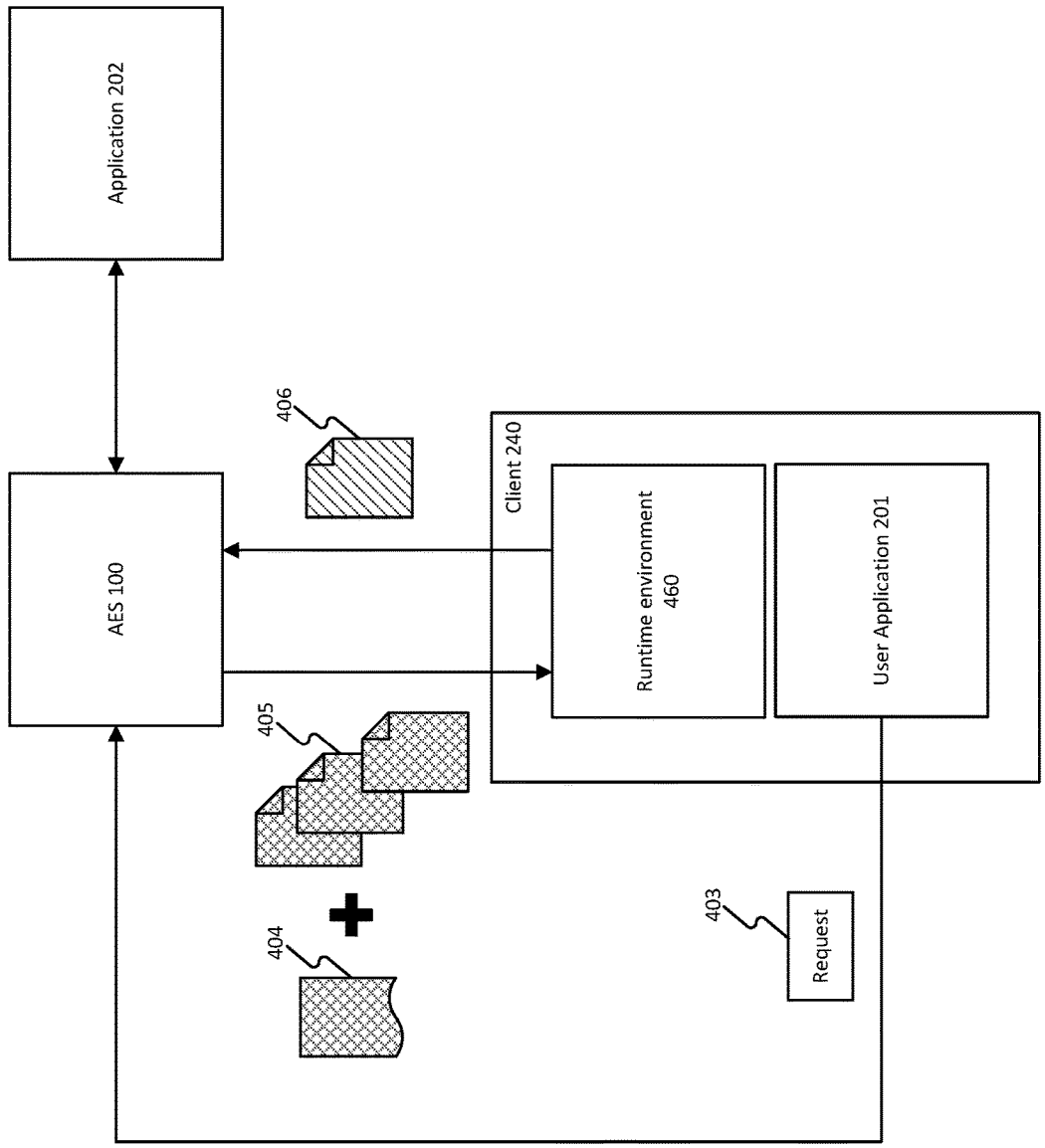
FIG. 4 is a block diagram of an exemplary system consistent with FIG. 1 to handle the distribution of portions of an application executing in a dynamic runtime environment, according to some embodiments of the present disclosure.

FIG. 4 is a block diagram of an exemplary system consistent with FIG. 1 to handle the distribution of portions of an application executing in a dynamic runtime environment, according to some embodiments of the present disclosure. As illustrated in FIG. 4, AES 100 may distribute logic portion 404 and state portion 405 of application 202 to the same computing instance, client 240, for execution without the need of a server (e.g., server 230, as shown in FIGS. 2 and 3) on runtime environment 460. Consistent with above embodiments, a developer of application 202 is not required to specify the location of logic portion 404 and the location of state portion 405 of application 202 before the application is executed, configured, or instantiated.

AES 100 may distribute logic portion 404 and state portion 405 based on request 403 from user application 201. User application 201 may run on a user device such as client 240. AES 100 may receive request 403 over a network (e.g., network 130). In some embodiments, AES 100 may transmit logic portion 404 of application 202 that can be performed offline on client 240. In some embodiments, AES 100 may distribute logic portion 404 and state portion 405 of application 202 to the same computing device to offer independence to the computing device to execute and generate an output of application 202.

Logic portion 404 and state portion 405 may be a subset of the overall logic and state forming application 202. AES 100 may distribute logic portion 404 and state portion 405 of application 202 associated with logic portion 404. AES 100 may select logic portion 404 among overall operations of applications 202 based on request 403. AES 100 may send logic portion 404 and state portion 405 to client 240 without making any changes to the scope of the variables in state portion 405 or access to the variable in logic portion 404. In some embodiments, AES 100 may transform some of the variables shared between operations in logic portion 404 and other operations in application 202.

AES 100 may distribute logic portion 404 to runtime environment 460 on client 240. For example, when client 240 requests execution of application 202 in an offline mode, AES 100 may transmit logic portions 404 of application 202 that can be performed offline and state portion 405 that is associated with logic portion 404. In some embodiments, AES 100 may distribute logic portion 404 and state portion 405 to a runtime environment in server 230 (not shown in FIG. 4) for execution of application 202 on server 230 alone. For example, when client 240 requests execution of application 202 in a secure manner, AES 100 may share logic portion 404 of application 202 and the associated state portion 405 with a server hosting AES 100 and avoid any transmission across the network to other computing instances. In some embodiments, logic portion 404 or state portion 405 selected for distribution may include all available logic state portions of application 202. AES 100 may maintain multiple copies of logic portion 404 to transition between different connectivity scenarios. For example, AES 100 may allow the transition of execution of application 202 from an online scenario with application logic portion (e.g., logic portion 404) executing on a server (e.g., server 230) and accessing data from state portion 405 on client 240, to an offline scenario where logic portion 404 is executing and accessing data from state portion 405 on a client (e.g., client 240).

Client 240 may transmit operations update 406, including updated state of state portion 405, after executing operations in logic portion 404. In some embodiments, client 240 may transmit operations update 406 after a subset of operations in logic portion 404 by including operations in logic portion 404 performed by client 240 to generate an updated state. In such a scenario, operations update 406 may only include a subset of state portion 405 updated by a subset of executed operations of logic portion 404. In some embodiments, operations update 406 may be received by AES 100 based on the connectivity scenario. For example, AES 100 may receive operations update 406 when client 240 goes online. AES 100 may receive operations update 406 and continue the remaining operations in logic portion 404 on client 240 or transition to server 230 (not shown in FIG. 4). Client 240 may send operations update 406 based on a configuration. Client 240 may receive configuration data to transmit operations update 406 along with logic portion 404 and/or state portion 405. In some embodiments, operations update 406 may be transmitted based on a timeout characteristic defined in the configuration data. Timeout characteristics may include the amount of time of execution of logic portion 404 on client 240, the number of operations of logic portion 404 executed on client 240, or the number of uses of variables overall or a certain variable in state portion 405.

AES 100 may persist updated state in operations update 406 in repository 120. AES 100 may validate the updated state before persisting it to repository 120. AES 100 may use validation checks 122 to validate the updated state by re-executing the executed operations listed in operations update 406. AES 100 may run the validation checks 122 using operations validator 133 to validate the updated state in operations update 406. AES 100 may continue to send the next set of logic portion and state portion of application 202 upon successful validation of operations identified in operations update 406.

Figure 5:
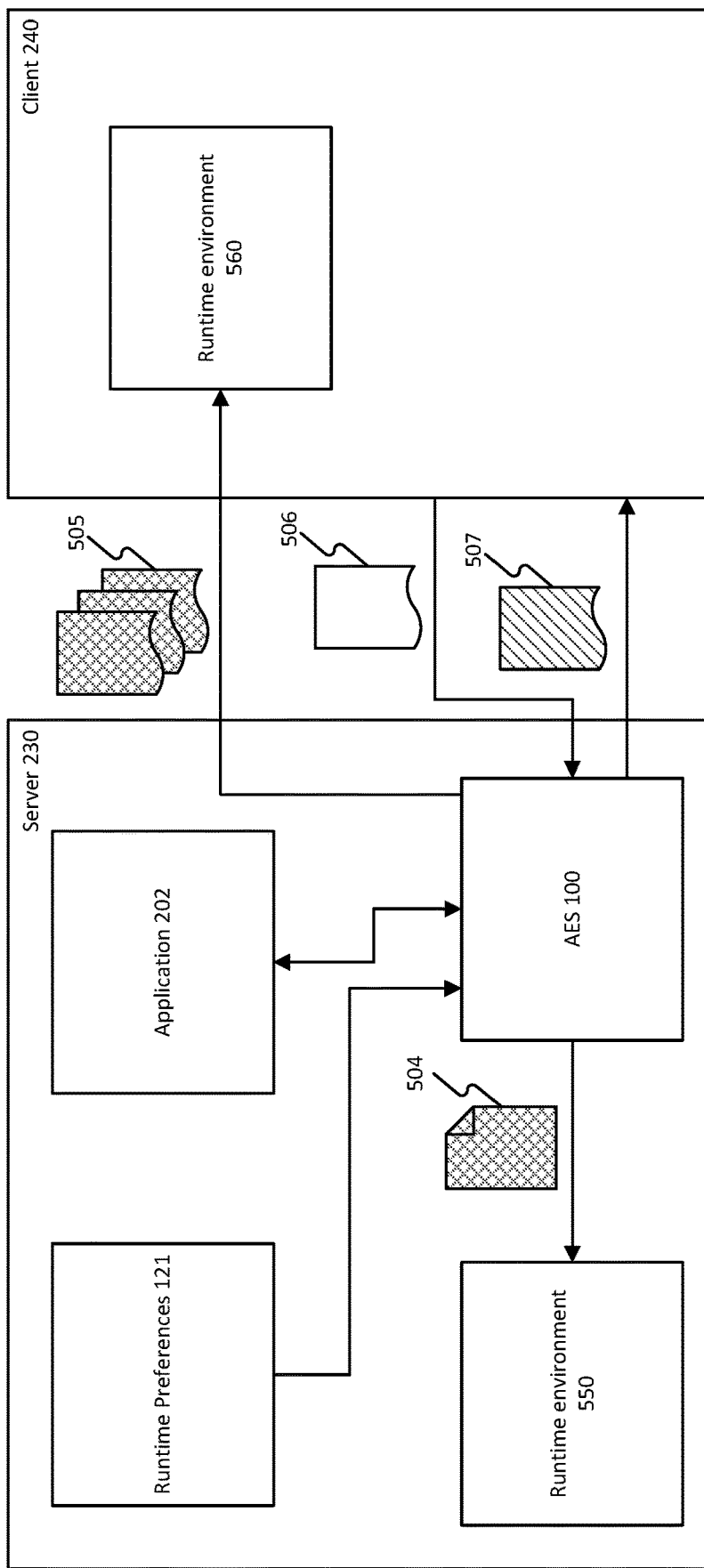
FIG. 5 is a block diagram of an exemplary system consistent with FIG. 1 to manage runtime environments for the execution of application, according to some embodiments of the present disclosure.

FIG. 5 is a block diagram of an exemplary system consistent with FIG. 1 to manage runtime environments for execution of application 202, according to some embodiments of the present disclosure. As illustrated in FIG. 5, AES 100 may dynamically determine to transmit logic portion 504 of application 202 to server 230 and state portion 505 of application 202 to client 240. Logic portion 504 may include entire operations in application 202 or a subset of operations. State portion 505 may include the entire state in application 202 or a part associated with logic portion 504. In some embodiments, AES 100 may transmit state in application 202 as a group of sets of variables to be accessed together.

AES 100 may review runtime preferences 121 to determine a runtime environment (e.g., runtime environment 550 and 560) to execute application 202. AES 100 may transition between various runtime environments for executing operations in application 202 over time. In some embodiments, AES 100 may determine multiple runtime environments of similar configuration. For example, as illustrated in FIG. 5, AES 100 may generate runtime environment 550 in server 230 and runtime environment 560 in client 240 to receive logic portion 504 and state portion 505, respectively.

As illustrated in FIG. 5, AES 100 in server 230 may receive state subset 506 of state portion 505 to utilize as input and store temporary and final results. AES 100 may transmit updated state subset 507 of received state subset 506 after completion of operations in logic portion 504. AES 100 may receive and transmit state subset 506 and updated state subset 507 over network 130 (as shown in FIG. 1). AES 100 may execute on the same computing device where logic portion 504 may execute in runtime environment 550. AES 100 may persist updated state subset 507 in repository 120 (as shown in FIG. 1). AES 100 may persist updated state subset 507 based on a configuration including trigger conditions. Trigger conditions may be static, happening regularly after a set period. In some embodiments, trigger conditions to persist updated state subset 507 to repository 120 may be dynamic based on the number of updates to variables in updated state subset 507, the number of executed operations in logic portion 504, or the number of repetitions of an operation in logic portion 504. Client 240 may include updated state subset 507 in the state portion 505 to share with any computing device for future requests to access data in state portion 505.

Figure 6:
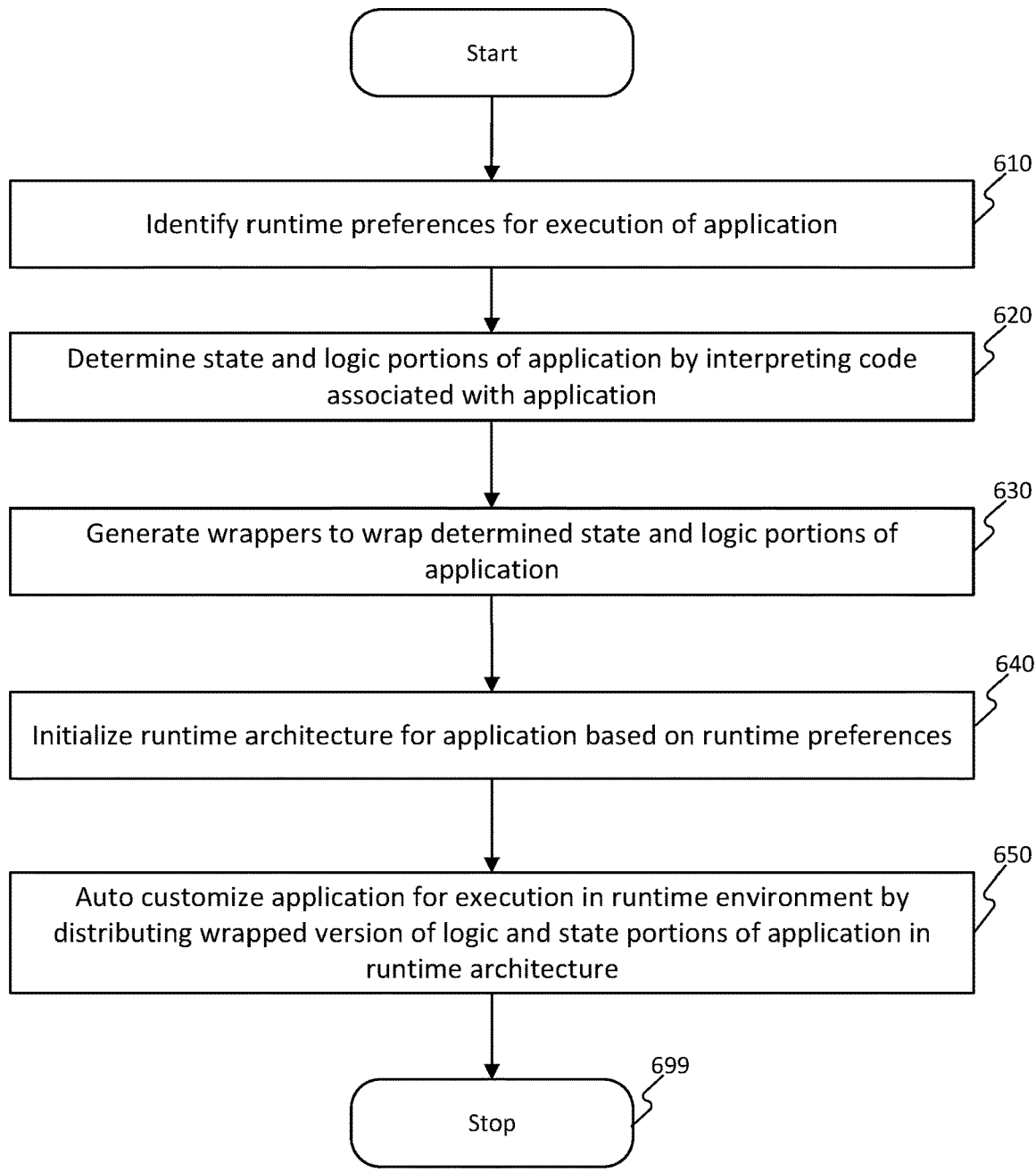
FIG. 6 is a flowchart depicting an exemplary method for handling the execution of an application in a dynamic runtime environment, according to some embodiments of the present disclosure.

FIG. 6 is a flowchart depicting an exemplary method for handling the execution of an application in a dynamic runtime environment, according to some embodiments of the present disclosure. The steps of method 600 may be performed by, for example, application execution system (AES) 100 (as shown in FIG. 1) for purposes of illustration. It will be appreciated that the illustrated method 600 can be altered to modify the order of the steps and to include additional steps or skip some of the steps.

In step 610, AES 100 may identify runtime preferences 121 (as shown in FIG. 1) for executing an application (e.g., application 202 of FIG. 2). AES 100 may identify runtime preferences 121 based on the prior execution history of an application. Runtime preferences 121 may include scaling requirements for an application, including a maximum number of users accessing an application and a maximum number of computing devices executing an application. AES 100 may receive scaling requirements as a configuration along with an application. In some embodiments, AES 100 may receive new scaling requirements with every new request to execute an application of applications 123 (as shown in FIG. 1). In some embodiments, runtime preferences 121 may include connectivity, computing resource, security, or compliance requirements of applications 123 over a period of time.

Consistent with above embodiments, step 610 may be performed based on direct user input or automatically. Automatic identification of runtime preferences may include, for example, running a machine learning algorithm that analyzes previously stored runtime preferences and user input. The machine learning algorithm may be trained to learn particular runtime preferences for execution of particular applications (e.g., based on the application, based on the user, based on application parameters, etc.).

In step 620, AES 100 may determine a state portion (e.g., state portion 205 of FIG. 2) and a logic portion (e.g., logic portion 204 of FIG. 2) of an application by interpreting code associated with the application. As discussed above, the logic portion of an application processes data provided by the state portion of the same application through variables in the application. The state portion representing variables in application code may store and share data with one or more functions of application code. The state portion may include details of a plurality of variables shared between functions of an application's code. AES 100 may prepare the shared state portion by grouping a plurality of variables in a global namespace accessible to multiple functions in an application's code sharing the variables. In some embodiments, AES 100 may need to rename some of the variables in the global namespace to maintain unique names and avoid conflicts with non-shared variables with matching names between functions. State wrapper 141 in AES 100 may help rename variables to make them unique in a global namespace by appending a function name using the variable with a matching name in another function. In some embodiments, state wrapper 141 may append variables passed as parameters with the calling function's name.

In step 630, AES 100 may generate wrappers to wrap an application's determined state and logic portions using wrapper module 111. AES 100 may wrap the state and logic portions based on, for example, the storage location. AES 100 may determine the location of the state portion and the logic portion of an application of applications 123 (as shown in FIG. 1) based on runtime preferences 121 associated with applications 123. For example, AES 100 may wrap the logic portion by replacing variable names with API calls to a remote computing device (e.g., client 240 of FIG. 2) storing the state portion of an application.

In step 640, AES 100 may initialize a runtime architecture for an application based on runtime preferences 121 by instantiating a runtime environment of runtime environments 160 (as shown in FIG. 1). AES 100 may need to, for example, spin up computing instances in a cloud as part of instantiating a runtime environment. This may include virtual machines, Docker™ instances, serverless code instances, etc. AES 100 may instantiate a runtime environment based on a request from a client device (e.g., client 240 of FIG. 2) to access an application. In some embodiments, AES 100 may automatically instantiate a runtime environment based on changes to an application or executing location. For example, AES 100 may be part of a CI/CD system monitoring for updates to an application's code and instantiating a runtime environment to execute an application's updated code.

In step 650, AES 100 may automatically customize an application for execution in a runtime environment of runtime environments 160 by distributing wrapped versions of logic and state portions of an application in a runtime architecture. AES 100 may customize the application by creating a plurality of instances of the logic portion of the application and copying each instance to a computing instance instantiated in step 640 based on a runtime environment. AES 100 may customize an application to scale the performance of an application by executing multiple instances of logic and state portions on multiple computing instances. In some embodiments, AES 100 may customize the application by allowing independent execution of each instance by copying both logic and state portions of the application to the same computing device. AES 100, upon completion of step 650, completes (step 699) executing method 600.

Figure 7:
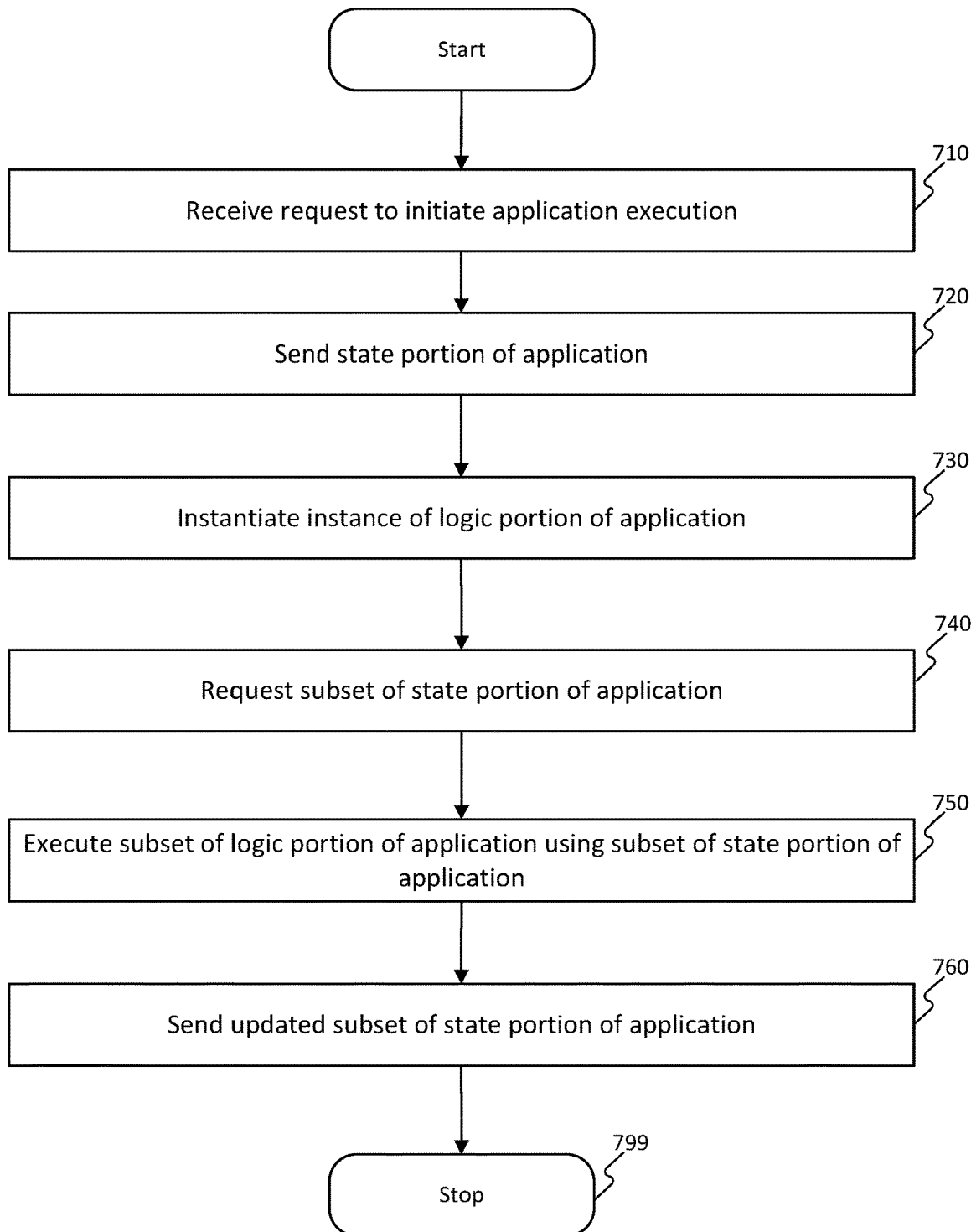
FIG. 7 is a flowchart depicting an exemplary method for managing a state portion of an application executing in a dynamic runtime environment, according to some embodiments of the present disclosure.

FIG. 7 is a flowchart depicting an exemplary method for managing a state portion of an application executing on a dynamic runtime environment, according to some embodiments of the present disclosure. The steps of method 700 may be performed by, for example, AES 100 for purposes of illustration. It will be appreciated that the illustrated method 700 can be altered to modify the order of the steps and to include additional steps or skip some of the steps.

In step 710, AES 100 may receive at a server (e.g., server 230 of FIG. 3) a request (e.g., request 303 of FIG. 3) from a client device (e.g., client 240 of FIG. 3) to initiate the execution of an application (e.g., application 202 of FIG. 3). The request 303 may identify details of application 202 such as the name of application 202 and file location of an executable of application 202. AES 100 may receive request 303 for executing application 202 from user application 201 running on client 240. In some embodiments, user application 201 may be running a third-party computing device other than server 230 and client 240 computing devices. A computing device running user application 201 may be a computing device (e.g., server 230 of FIG. 3) for the result of the execution of application 202. In some embodiments, a computing device running user application 201 may be a mobile device, an Internet of Things device, an embedded system, or a computer.

User application 201 may include a native application or a web browser application accessing application 202, a cloud-based application. User application 201 may send request 303 over network 130 to access application 202 and results generated by application 202. Request 303 may include a request for executing a function of application 202. In some embodiments, a user interface associated with application 202 may generate request 303 to execute a function of application 202. For example, user application 201 may be a web browser to access the user interface of application 202 to request the execution of a function of application 202. In some embodiments, request 303 may include the name of a function of application 202. Request 303 may include a description of state portion (e.g., state portion 305 of FIG. 3) required to execute application 202.

In step 720, AES 100 may send a state portion (e.g., state portion 305 of FIG. 3) of application 202 to client 240. Client 240 may be a user device running user application 201 and made a request 303 to execute application 202. State portion 305 of application 202 may include a set of all variables associated with application 202. AES 100 may have previously aggregated all variables of application 202 and stored them in a global namespace. In some embodiments, AES 100 may dynamically determine state portion 305 of application 202 based on execution request 303 associated with application 202.

In step 730, AES 100 may instantiate one or more instances of logic portion 304. AES 100 may instantiate logic portion 304 by instantiating a server (e.g., server 230 of FIG. 3) and transmitting logic portion 304 of application 202 to server 230. Server 230 instantiated by AES 100 may include multiple computing instances in a cloud (e.g., Amazon AWS, Google Cloud, Azure). AES 100 may be running on the same computing device designated server 230 by AES 100. In some embodiments, AES 100 may instantiate additional instances of server 230 to execute logic portion 306 of application 202. In some embodiments, AES 100 may access a pre-configured value identifying the required number of instances of logic portion 304 executing on computing instances comprising server 230. A user of AES 100 may provide the pre-configured value of the number of instances along with the application. In some embodiments, the pre-configured value may include a set of values for different execution circumstances that may be factors external to application 202. For example, each value in a set of pre-configured values of the number of instances of logic portion 304 may be based on the function or portion of application 202 requested for execution by user application 201. In another example, different values of the number of instances of logic portion 304 may be based on the type of computing instances offered by a cloud vendor for executing application 202. For example, each cloud vendor may offer computing instances of different configurations (e.g., CPU, memory, etc.). In some embodiments, AES 100 may dynamically determine the number of instances of logic portion 304 based on a number of requests to instantiate the execution of application 202. AES 100 may predict the number of instances based on historic requests for execution of application 202.

In step 740, AES 100 may request a subset (e.g., state subset 321 of FIG. 3) of state portion 305 (as shown in FIG. 3) of application 202. State subset 321 may include variables accessed by an operation forming a subset of logic portion 304 requested for execution. AES 100 may request state subset 321 from client 240 over network 130. Server 230 may receive state subset 321 and pass it to logic portion 304.

In step 750, AES 100 may execute a subset of logic portion 304 of application 202 using state subset 321 of state portion 305 of application 202. In some embodiments, AES 100 may receive an enclosed state from client 240, a subset of the state portion 305 accessed by an instance of logic portion 304 based on the received request from user application 201 running on client 240.

In step 760, AES 100 may send an updated subset (e.g., updated state 323 of FIG. 3) of state portion 305 of application 202 to client 240. Client 240 may incorporate updated state 323 to provide them in future requests to execute logic portion 304. In some embodiments, AES 100 may persist updated state 323 to repository 120 (as shown in FIG. 1). AES 100, upon completion of step 760, completes (step 799) executing method 700.

Figure 8:
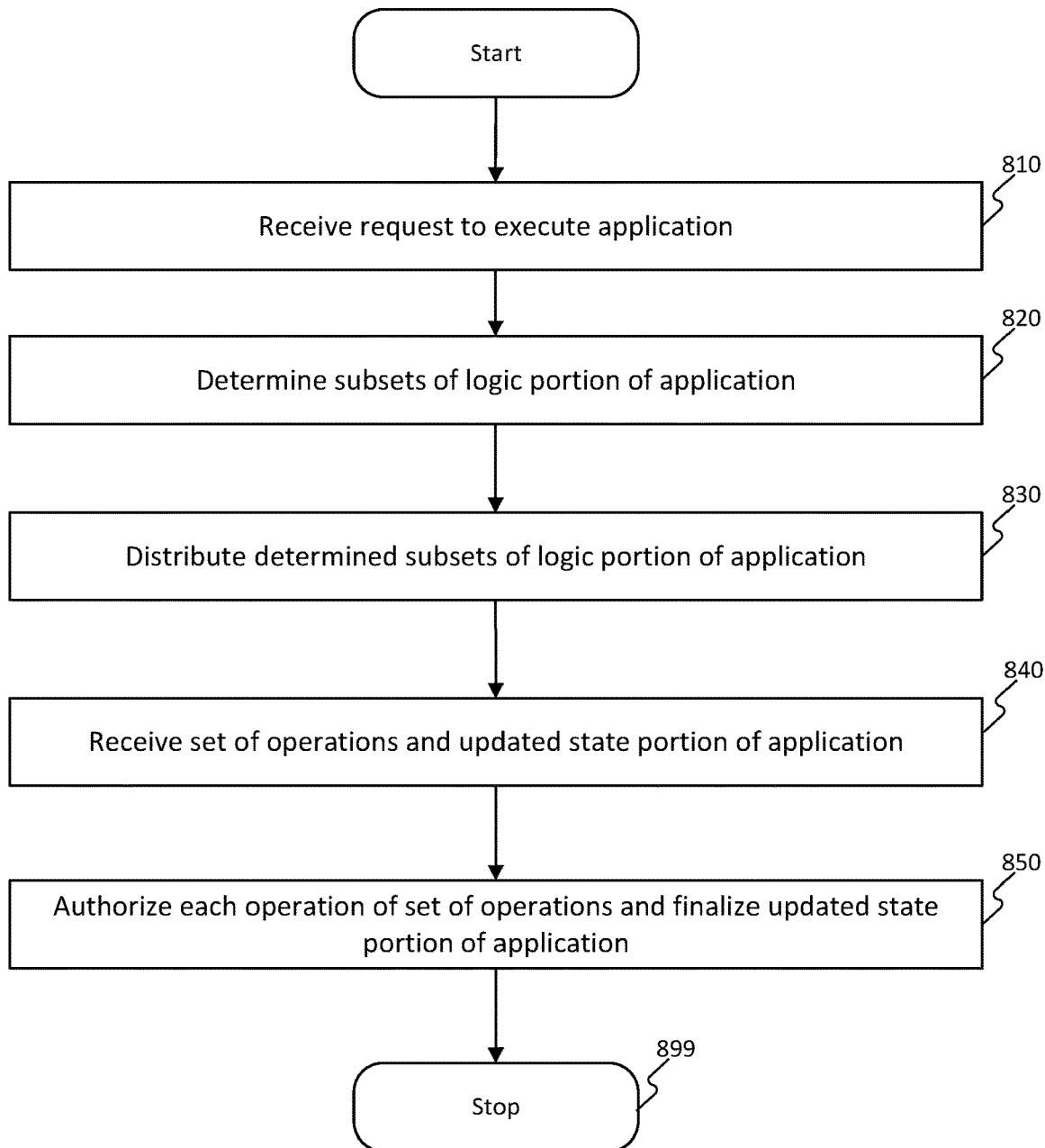
FIG. 8 is a flowchart depicting an exemplary method for handling the distribution of portions of an application executing in a dynamic runtime environment, according to some embodiments of the present disclosure.

FIG. 8 is a flowchart depicting an exemplary method for handling the distribution of portions of application 202 (as shown in FIG. 4) for execution in a dynamic runtime environment, according to some embodiments of the present disclosure. The steps of method 800 may be performed by, for example, application execution system (AES) 100 for purposes of illustration. It will be appreciated that the illustrated method 800 can be altered to modify the order of the steps and to include additional steps or skip some of the steps.

In step 810, AES 100 may receive a request (e.g., request 403 of FIG. 4) from a client (e.g., client 250 of FIG. 4) to execute application 202. AES 100 may be running on server 230 (as shown in FIG. 4) and may receive a request (e.g., request 403 of FIG. 4) over network 130.

In step 820, AES 100 may determine subsets of a logic portion (e.g., logic portion 404 of FIG. 4) of application 202. Each subset of logic portion 404 of application 202 may be an execution path through application 202 as determined by previous execution requests of application 202. In some embodiments, a subset of logic portion 404 may be a function in application 202 requested for execution.

In some embodiments, AES 100 may identify subsets of logic portion 404 that can execute on a client device (e.g., client 240 of FIG. 4). AES 100 may identify such subsets of logic portion 404 based on the part of logic portion 404 of application 202 that can execute with network connectivity limitations. AES 100 may consider network connection limitations when there is an intermittent connection, low bandwidth, or a prediction to be offline. AES 100 may include each identified subset of logic portion 404 of application 202 to be transmitted to a different computing device, for example, client 240 for execution.

In step 830, AES 100 may distribute determined subsets of logic portion 404 identified in step 820 to client 240. In some embodiments, AES 100 may distribute subsets of logic portion 404 over network 130. AES 100 may also send a state portion (e.g., state portion 405 of FIG. 4) of application 202 to client 240. State portion 405 may include a set of all variables associated with the application. In some embodiments, state portion 405 may only include variables storing data associated with an identified subset of logic portion 404.

In step 840, AES 100 may receive a set of operations (e.g., operations update 406 of FIG. 4) from client 240 of application 202. Operations sent by application 202 may include operations in subsets of logic portion 404 executed on client 240 independently. In some embodiments, operations may include those executed when client 240 was offline. AES 100 may re-execute each operation on server 230 using values of variables in state portion 405 when sent to client 240 in step 830. To re-execute operations on server 230, AES 100 may request client 240 to transmit requests for execution of operations to server 230 (as shown in FIG. 2). AES 100 may also receive an updated state along with operations of logic portion 204 in operations update 406. The updated state may include a subset of state portion 405 that may have been used by operations executed on client 240. Operations update 406 may include the type of update performed on each variable of state portion 405, such as addition, deletion, and modification of the values. For example, the type of update may include the addition, deletion, or update of a row or a cell in a table representing state portion 405.

In step 850, AES 100 may optionally authorize each operation in operations update 406 received and replayed in step 840. AES 100 authorizes operations to finalize the updated state portion of application 202. AES 100 may authorize an operation by validating the operation based on: an accessed subset of state portion 405 of application 202, a user of a client device (e.g., client 240 of FIG. 2) requesting execution of the application, and an order of the set of operations. AES 100 may authorize operations executed by a user of client 240 who had permission to perform operations in operations update 406.

AES 100 may also approve updates to subsets of state portion 405 when the operation of the set of operations is determined valid. AES 100 may then send the finalized updated state portion of application 202 to client 240 to use in future requests for execution of logic portion 404. In some embodiments, the approved updated state may not include some variables not authorized by AES 100. In some embodiments, AES 100 may send the validated operations to client 240 to determine what parts of the updated state to maintain at client 240 and discard state updates associated with invalid operations. AES 100, upon completion of step 850, completes (step 899) executing method 800.

Figure 9:
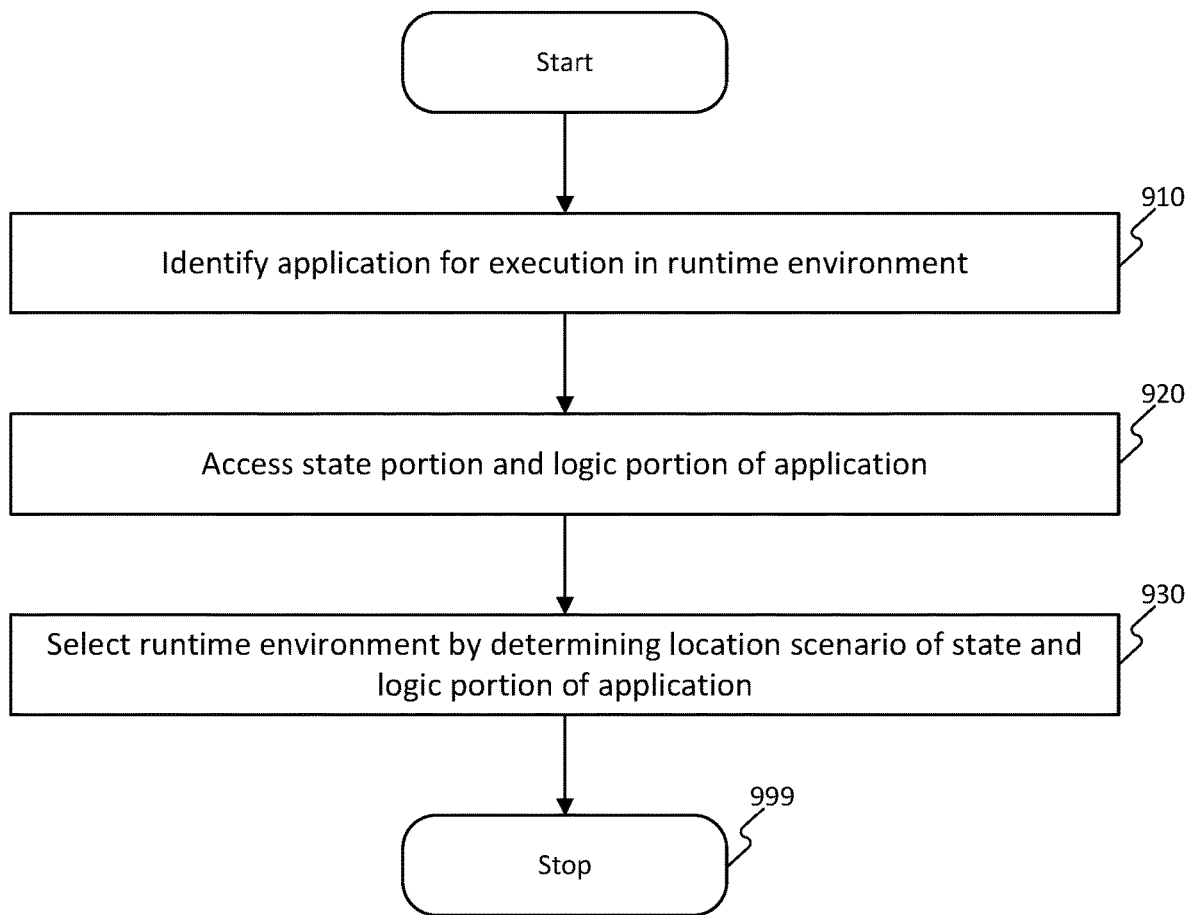
FIG. 9 is a flowchart depicting an exemplary method for managing runtime environments for application execution, according to some embodiments of the present disclosure.

FIG. 9 is a flowchart depicting an exemplary method for managing runtime environments for the execution of an application (e.g., application 202 of FIG. 5), according to some embodiments of the present disclosure. The steps of method 900 may be performed by, for example, AES 100 for purposes of illustration. It will be appreciated that the illustrated method 900 can be altered to modify the order of the steps and to include additional steps or skip some of the steps.

In step 910, AES 100 may identify application 202 (as shown in FIG. 5) at a server (e.g., server 230 of FIG. 5) for execution in a runtime environment (e.g., a client-server setup of server 230 and client 240 of FIG. 5). AES 100 may execute application 202 on server 230 based on runtime preferences 121 (as shown in FIG. 5). In some embodiments, AES 100 may identify application 202 upon receiving a request to execute an application. In some embodiments, AES 100 may identify application 202 for execution when it is updated. For example, AES 100 may be integrated with a continuous integration/continuous delivery (CI/CD) system to execute various unit tests on updated application 202. In some embodiments, AES 100 may identify application 202 based on details of the received request. For example, AES 100 may be integrated with a web server (e.g., Apache web server) receiving API requests and may execute application 202 as a service accessible through a web server. AES 100 may identify application 202 in applications 123 (as shown in FIG. 1) in repository 120 (as shown in FIG. 1) based on a received request.

In step 920, AES 100 may access a state portion (e.g., state portion 505 of FIG. 5) and a logic portion (e.g., logic portion 504 of FIG. 5) of application 202. AES 100 may access state portion 505 and logic portion 504 from repository 120 determined previously. In some embodiments, AES 100 may dynamically determine logic portion 504 of application 202 for execution in a runtime environment. For example, logic portion 504 includes functions associated with API calls received as a request. AES 100 may dynamically determine state portion 505 of application 202 associated with dynamically determined logic portion 504.

In step 930, AES 100 may select a runtime environment by determining a location scenario of location scenarios 124 (as shown in FIG. 1) of state portion 505 and logic portion 504 of application 202. Location scenarios (e.g., location scenarios 124 of FIG. 1) of application 202 may be determined dynamically based on runtime preferences 121 associated with application 202. In some embodiments, AES 100 may pre-process application 202 to determine location scenarios of variables and operations in state portion 505 and logic portion 504. A location scenario determined by AES 100 may include location combinations of state portion 505 and logic portion 504 between server 230 and client 240. In some embodiments, AES 100 may include additional computing devices to form architectures other than a client-server setup to store and utilize logic portion 504 and state portion 505. In some embodiments, AES 100 may associate different execution circumstances for each combination, including server 230 and client 240. Different execution circumstances may include physical location, cloud provider used for computing instances, and type of requests (automate CI/CD request and manual user request) to execute application 202.

AES 100 may determine location scenarios 124 by identifying the connectivity status of application 202 over a period of time. AES 100 may observe the execution of application 202 in various settings to determine its connectivity status. Connectivity status may include the ability to communicate with other computing devices hosting copies of state portion 205 and/or logic portion 204. In some embodiments, connectivity status may include bandwidth capacity to communicate with other computing devices hosting state portion 205 and/or logic portion 204. In some embodiments, AES 100 may determine location scenarios 124 based on accounts used to execute application 202. For example, location scenarios of state portion 205 and logic portion 204 may be a network of computing devices authorized for access by a user account.

AES 100 may select a runtime environment of runtime environments 160 by determining resource requirements of state portion 205 of application 202. AES 100 may introduce additional computing resources if state portion 205 exceeds a resource threshold. The resource threshold of state portion 205 may be pre-configured by a user of AES 100. In some embodiments, the resource threshold may be determined by AES 100 by reviewing previous execution requirements of application 202. In some embodiments, AES 100 may train a machine learning model to predict the overall resource requirements of application 202. In some embodiments, AES 100 may determine resource requirements of state portion 205 of a portion of application 202, such as function requested by a user of AES 100.

AES 100 may review various possible location scenarios 124 and a current request for execution to determine the runtime environment for execution of application 202. AES 100 may determine a runtime environment dynamically based on a request (e.g., request 203 of FIG. 2). In some embodiments, AES 100 may select a runtime environment from runtime environments 160 (as shown in FIG. 1) determined previously and stored in repository 120 (as shown in FIG. 1). AES 100 may receive runtime preferences (e.g., runtime preferences 121 of FIG. 1) AES 100 may map location scenarios 124 to runtime environments 160 and select a runtime environment based on the determined location scenario.

AES 100 may generate a plurality of runtime environments (e.g., runtime environments 160) to execute application 202 at different times based on determined location scenarios 124. AES 100 may collectively use multiple runtime environments to execute application 202. Runtime environments 160 may include different configurations of runtime environment with state portion 505 and logic portion 504 of application 202 located in various combinations on server 230 and client 240. In some embodiments, AES 100 may generate a set of runtime environments to execute application 202 based on scalability requirements received by AES 100 as part of request 203. In some embodiments, AES 100 may generate runtime environments based on connectivity, computing resource, security, or compliance requirements of applications 123 over a period of time.

In some embodiments, AES 100 may receive scalability requirements along with application 202. AES 100 may store scalability requirements in runtime preferences 121. AES 100 may select a runtime for execution among the generated runtime environments based on runtime preferences and location scenarios. After selecting a runtime environment and executing application 202 in a runtime environment in step 930, AES 100 completes (step 999) executing method 900.

The present disclosure also relates to a system for performing the operations herein. This system may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, hard disks or drives, tape disks or drives, read-only memories (ROMs), random access memories (RAMs), EPROMs, EEPROMs, magnetic or optical cards, or any type of media suitable for storing electronic instructions, each coupled to a computer system bus.

Embodiments of the present disclosure may be implemented with computer executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

Computer programs based on the written description and methods of this specification are within the skill of a software developer. The various programs or program modules can be created using a variety of programming techniques. For example, program sections or program modules can be designed by means of JavaScript, Scala, Python, Java, C, C++, assembly language, or any such programming languages, as well as data encoding languages (such as XML, JSON, etc.), query languages (such as SQL, GraphQL, DGatalog, SPARQL), presentation-related languages (such as HTML, CSS etc.) and data transformation language (such as XSL). One or more of such software sections or modules can be integrated into a computer system, non-transitory computer readable media, or existing communications software.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references, unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is indented that all matter contained in the above description and shown in the accompanying drawings shall be interpreted as illustrative and not in a limiting sense.

What is claimed is:

1. A non-transitory computer readable medium including instructions that, when executed by at least one processor, cause the at least one processor to perform operations for seamless offline-online execution of applications, the operations comprising:
    receiving at a server a request from a client device for execution of an application;
    determining one or more subsets of a logic portion of the application;
    distributing the determined one or more subsets of the logic portion of the application to the client device;
    receiving a set of operations from the client device and an updated state portion of the application; and
    authorizing each operation of the set of operations and finalizing the updated state portion of the application.

2. The non-transitory computer readable medium of claim 1, wherein determining the one or more subsets of the logic portion of the application further comprises:
    identifying subsets of the logic portion of the application that can execute offline, wherein the identified subsets of the logic portion of the application can execute on the client device; and
    including the identified subsets of the logic portion in the one or more subsets of the logic portion of the application.

3. The non-transitory computer readable medium of claim 1, wherein distributing the determined one or more subsets of the logic portion of the application to the client device further comprises:
    sending a state portion of the application to the client device, wherein the state portion of the application includes a set of all variables associated with the application.

4. The non-transitory computer readable medium of claim 1, wherein receiving the set of operations from the client device further comprises:
    receiving one or more offline operations of the one or more subsets of the logic portion of the application executed on the client device when the client device was offline; and
    replaying each operation of the one or more offline operations as requests for execution of the application from the client device.

5. The non-transitory computer readable medium of claim 1, wherein authorizing the each operation of the set of operations and finalizing the updated state portion of the application further comprises:
    validating each operation of the set of operations based on: an accessed subset of the state portion of the application, a user of the client device requesting execution of the application, and an order of the set of operations; and
    approving updates to subsets of the state portion when the operation of the set of operations is valid, wherein approved updates to the subsets of the state portion of the application are included in the updated state portion of the application.

6. The non-transitory computer readable medium of claim 5, wherein the updated state portion of the application includes the accessed subset of the state portion of the application.

7. The non-transitory computer readable medium of claim 1, wherein the updated state portion of the application includes a subset of the state portion of the application, wherein the subset of the state portion of the application includes updated values.

8. The non-transitory computer readable medium of claim 7, wherein the updated values include addition, deletion, and modification of the values.

9. The non-transitory computer readable medium of claim 1, wherein the operations further comprise:
    sending the finalized updated state portion of the application to the client device.

10. A computer implemented method for seamless offline-online execution of applications, the method comprising:
    receiving at a server a request from a client device for execution of an application;
    determining one or more subsets of a logic portion of the application;
    distributing the determined one or more subsets of the logic portion of the application to the client device;
    receiving a set of operations from the client device and an updated state portion of the application; and
    authorizing each operation of the set of operations and finalizing the updated state portion of the application.

11. The computer implemented method of claim 10, wherein determining the one or more subsets of the logic portion of the application further comprises:
    identifying subsets of the logic portion of the application that can execute offline, wherein the identified subsets of the logic portion of the application can execute on the client device; and
    including the identified subsets of the logic portion in the one or more subsets of the logic portion of the application.

12. The computer implemented method of claim 10, wherein the method further comprises:
    sending a state portion of the application to the client device, wherein the state portion of the application includes a set of all variables associated with the application.

13. The computer implemented method of claim 10, wherein receiving the set of operations from the client device and the updated state portion of the application further comprises:
    receiving one or more offline operations of the one or more subsets of the logic portion of the application executed on the client device when the client device was offline; and
    replaying each operation of the one or more offline operations as requests for execution of the application from the client device.

14. The computer implemented method of claim 10, wherein authorizing each operation of the set of operations and finalizing the updated state portion of the application further comprises:
    validating each operation of the set of operations based on: an accessed subset of the state portion of the application, a user of the client device requesting execution of the application, and an order of the set of operations; and approving updates to subsets of the state portion when the operation of the set of operations is valid, wherein approved updates to the subsets of the state portion of the application are included in the updated state portion of the application.

15. The computer implemented method of claim 14, wherein the updated state portion of the application includes the accessed subset of the state portion of the application.

16. The computer implemented method of claim 10, wherein the updated state portion of the application includes a subset of the state portion of the application, wherein the subset of the state portion of the application includes updated values.

17. A client device comprising:
one or more memory devices storing processor-executable instructions; and
one or more processors configured to execute processor-executable instructions to perform operations for seamless offline-online execution of applications, the operations comprising:
receiving a request from a user to execute an operation of an application;
determining a connectivity of the client device to a network;
identifying a subset of a logic portion of the application relevant for the execution of the requested operation of the application when the connectivity to the network fails;
executing the identified subset of the logic portion of the application, wherein the execution of the identified subset of the logic portion includes reading and updating a subset of a state portion of the application; and
recording the executed subset of the logic portion of the application and the updated subset of the state portion of the application.

18. The client device of claim 17, wherein identifying the subset of the logic portion of the application relevant for the execution of the requested operation further comprises:
determining one or more offline operations from one or more subsets of the logic portion that satisfy the requested operation; and
executing the one or more offline operations using the state portion of the application.

19. The client device of claim 17, wherein the operations further comprise:
sending the executed subset of the logic portion of the application to a server when the client device is online and connected to the network; and
sending the updated subset of the state portion of the application.

* * * * *

UNITED STATES PATENT AND TRADEMARK OFFICE
CERTIFICATE OF CORRECTION

| | | |
|---|---|---|
| PATENT NO. | : 11,822,937 B1 | |
| APPLICATION NO. | : 18/179597 | |
| DATED | : November 21, 2023 | |
| INVENTOR(S) | : Andrew Radcliffe et al. | |

It is certified that error appears in the above-identified patent and that said Letters Patent is hereby corrected as shown below:

On the Title Page

Item (22) Filed, change "Mar. 21, 2023" to --Mar. 7, 2023--.

Item (57) ABSTRACT, on Line 6, change "Technique further include" to --Techniques further include--.

Item (57) ABSTRACT, on Line 10, change "Technique further include" to --Techniques further include--.

Signed and Sealed this
Ninth Day of April, 2024

*Katherine Kelly Vidal*

Katherine Kelly Vidal
*Director of the United States Patent and Trademark Office*